(12) United States Patent
Inaji et al.

(10) Patent No.: US 6,950,271 B2
(45) Date of Patent: Sep. 27, 2005

(54) DISK DRIVE AND DISK DRIVE CONTROL METHOD

(75) Inventors: Toshio Inaji, Osaka (JP); Hiroshi Kohso, Osaka (JP); Keizo Miyata, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 70 days.

(21) Appl. No.: 10/670,199

(22) Filed: Sep. 26, 2003

(65) Prior Publication Data

US 2004/0080860 A1 Apr. 29, 2004

(30) Foreign Application Priority Data

Sep. 27, 2002 (JP) ..................................... P2002-282989

(51) Int. Cl.[7] ............................................. G11B 5/596
(52) U.S. Cl. ............................. 360/78.04; 360/77.06; 360/78.09
(58) Field of Search ............................. 360/75, 77.01, 360/77.02, 77.05–77.08, 77.11, 78.01, 78.04, 78.06, 78.07, 78.09

(56) References Cited

U.S. PATENT DOCUMENTS 5,684,650 A * 11/1997 Kadlec et al. ........... 360/77.06

FOREIGN PATENT DOCUMENTS

JP             9-231701            9/1997

* cited by examiner

Primary Examiner—David Hudspeth
Assistant Examiner—Jason Olson
(74) Attorney, Agent, or Firm—McDermott Will & Emery LLP

(57) ABSTRACT

A position detector generates a position error signal corresponding to a current position of a head, a position controller generates a position control signal from the position error signal, a voltage detector detects a voltage signal generated when driving an actuator by a driver, a disturbance estimator generates a disturbance estimation signal from a driving signal and the voltage signal, and a corrector outputs the driving signal from the disturbance estimation signal and the position control signal. The disturbance estimator includes a comparator which compares the disturbance estimation signal with a voltage signal and which outputs a deviation signal, and an adder which adds a signal obtained by multiplying an integral signal, which is obtained by integrating the deviation signal, by a first coefficient and a signal obtained by multiplying a proportional signal proportional to the deviation signal by a second coefficient, and which generates the disturbance estimation signal. The disturbance estimation signal suppresses a tracking deviation of the head due to a disturbance such as an inertial force applied to the head actuator and stabilizes head positioning control.

14 Claims, 22 Drawing Sheets

DISK DRIVE AND DISK DRIVE CONTROL METHOD

BACKGROUND OF THE INVENTION

1. Field of the Invention

The present invention relates to a disk drive which highly accurately positions a recording/reproducing head on a target track of a disk serving as a recording medium by an actuator. More specifically, the present invention relates to a technique for suppressing deviation of a head from a target track by a disturbance that acts on an actuator.

The present invention also relates to a disk drive having a load/unload mechanism which unloads a head to a head rest member such as a ramp block outside of a disk when the head is stopped and which loads the head onto a disk surface from the head rest member when the head is used, and to a technique for stably loading the head onto the disk surface under appropriate velocity control even if a disturbance on the head rest member is great.

2. Description of the Related Art

In recent years, disk drives such as magnetic disk drives are increasingly made small in size and large in capacity and tracks increasingly tend to be high in density and narrow in pitch, accordingly. Therefore, it has become important to position a head on a target track with high accuracy. Namely, the head reads servo information recorded on the disk in advance to generate a position error signal for the head relative to the target track and the positioning of the head is controlled so that the position error signal can be minimized. To accelerate a positioning velocity, the control frequency of a positioning control system is set high. However, the inherent mechanical resonance of an actuator of the head makes the positioning control system instable. Under these circumstances, there is naturally a limit to setting the control frequency high.

As the track is higher in density and narrower in pitch and the actuator is made smaller in size and lighter in weight, the influence of a disturbance that acts on the actuator on the positioning control system increases. On the other hand, the highly accurate positioning of the head is strictly required. To meet the demand, it is significant to reduce the disturbance which causes deterioration of the head positioning accuracy. To this end, a technique for estimating a disturbance based on a head position signal obtained from servo information recorded on the disk and a driving signal for the actuator, and for compensating for the disturbance by feedforward control has been conventionally proposed.

However, the servo information on the disk is discrete information having a constant sampling cycle and the head position signal that reproduces the servo information is not a continuous signal. Because of the restriction of the sampling frequency of the servo information, a control band of the disturbance estimation means has an upper limit and the presence of the upper limit makes it disadvantageously difficult to accurately estimate the disturbance. As a result, it is disadvantageously difficult to make the head always accurately follow up the target track.

Furthermore, the disturbance changes greatly on the head rest member due to sliding friction, so that a velocity of a head slider changes considerably. Even if the head slider velocity is feedback-controlled, the change of a head loading velocity is great and the head slider is often disadvantageously struck against the disk.

SUMMARY OF THE INVENTION

The present invention has been made to solve the above-stated conventional disadvantages. It is, therefore, an object of the present invention to improve positioning accuracy for positioning a head on a target track by allowing disturbance estimation means to accurately estimate a disturbance that acts on actuator means and satisfactorily canceling the disturbance.

It is another object of the present invention to provide a disk drive capable of ensuring stable velocity control by compensating for an external force such as a friction that acts on an actuator even if a disturbance on a head rest member changes greatly.

To cancel the disturbance such as a bearing friction, an elastic force or an inertial force resulting from a shock or a vibration that is applied to the actuator means, the magnitude of the disturbance is estimated. To estimate the magnitude of the disturbance, two elements are employed. One element is a voltage signal obtained as a result of detecting a voltage generated when driving the actuator means. The other element is a driving signal for driving means for driving the actuator means. The driving signal for the driving means may be either input to the driving means or output from the driving means. Alternatively, a position control signal based on which the driving signal is generated maybe employed instead of the driving signal for the driving means. To be specific, disturbance estimation means for estimating the magnitude of the disturbance is provided. This disturbance estimation means inputs the voltage signal detected by the voltage detection means and the driving signal for the driving means or position control signal, and generates a disturbance estimation signal. The disturbance estimation signal generated based on the two elements accurately estimates the magnitude of the disturbance that actually acts on the head. As a result, it is possible to accurately estimate the magnitude of such a disturbance as the bearing friction of the actuator means, the elastic force of an FPC (flexible printed circuit) that connects the actuator means to an electronic circuit board the inertial force that acts on the actuator means due to a shock or a vibration applied onto the disk drive from outside.

Based on the disturbance estimation signal that is accurately estimated as stated above, correction means combines the disturbance estimation signal with the position control signal supplied from the position control means and generates a driving signal so as to cancel the disturbance that acts on the actuator means. By driving the actuator means for the head based on the driving signal, the disturbance such as the bearing friction, the elastic force or the inertial force that acts on the actuator means and thereby can be cancelled and satisfactorily compensated for the disturbance.

Besides these respects, the present invention takes the following respects into account.

The disturbance estimation means generates a voltage estimation signal which corresponds to an input voltage signal, compares this voltage estimation signal with the input voltage signal, and generates a deviation signal that indicates a difference between the voltage estimation signal and the input voltage signal. Further, the disturbance estimation means generates an integral signal obtained by integrating this deviation signal and a proportional signal proportional to the deviation signal, feedbacks an addition signal obtained by adding the integral signal and the proportional signal so as to generate the voltage estimation signal, and makes the deviation signal close to zero.

As a basic concept of generating the disturbance estimation signal returned to the correction means, there is a concept of generating the disturbance estimation signal based only on the integral signal. In the case where the disturbance estimation signal is generated based only on the integral signal, the above-stated function can be exhibited to compensate for the disturbance by driving the actuator means based on the driving signal obtained by combining the disturbance estimation signal and the position control signal.

However, in the case where the disturbance estimation signal is generated based only on the integral signal, a phase difference is generated between the disturbance estimation signal and an actual disturbance and the disturbance estimation signal has a phase delay relative to the actual disturbance. When the actuator means is driven by the driving signal based on the disturbance estimation signal that has the phase delay, there is no avoiding the influence of the phase delay although the advantage of compensating for the disturbance can be exhibited. Therefore, it still leaves room for improvement. The present invention adds the following means so as to ensure sufficient compensation for the disturbance.

The disturbance estimation means adds the integral signal for the deviation signal and the proportional signal for the deviation signal at a certain ratio and generates a disturbance estimation signal. If a is the integral signal, b is the proportional signal, and k1 and k2 are coefficients that are not zero, then the disturbance estimation signal $\tau dest$ can be expressed by $\tau dest = k_1 \cdot a + k_2 \cdot b$. The proportional signal has an advanced phase from that of the integral signal by 90 degrees (e.g., see FIG. 7). Accordingly, an appropriate combination of the integral signal and the proportional signal can decrease the phase delay. Namely, the disturbance estimation signal closer to the actual disturbance can be generated. The correction means combines the disturbance estimation signal in which this phase delay is suppressed with the position control signal to obtain the driving signal, and drives the actuator means by the obtained driving signal. This enables satisfactory, sufficient compensation for the disturbance such as the bearing friction, the elastic force or the inertial force that acts on the actuator means. As a result, even if the change of the disturbance that acts on the actuator means is great during a following operation for allowing the head to follow up the target track, the positioning of the head on the target track can be stably controlled. This can in turn increase the density of a track and help realize a disk drive having a large storage capacity.

The present invention stated above will be described more concretely.

According to a first aspect of the present invention, a disk drive of the present invention comprises a plurality of constituent elements. The disk drive comprises:

actuator means for positioning a head relative to a disk;

driving means for driving the actuator means;

voltage detection means for detecting a voltage generated when driving the actuator means, and for outputting a voltage signal;

disturbance estimation means for estimating a magnitude of a disturbance applied to the head from a driving signal for the driving means and the voltage signal, and for generating a disturbance estimation signal;

position detection means for generating a position error signal corresponding to a current position of the head from servo information recorded on the disk in advance and detected by the head;

position control means for generating a position control means corresponding to the position error signal; and correction means for combining the position control signal with the disturbance estimation signal to generate the driving signal.

The disturbance estimation means comprises:

comparison means for comparing the disturbance estimation signal generated by the disturbance estimation means with the voltage signal, and for outputting a deviation signal; and addition means for adding a signal obtained by multiplying an integral signal, which is obtained by integrating the deviation signal, by a first coefficient and a signal obtained by multiplying a proportional signal proportional to the deviation signal by a second coefficient, and for generating the disturbance estimation signal.

In this constitution, the driving signal for the driving means may be either input to the driving means or output from the driving means. The same shall apply hereinafter.

The function of this first aspect of the invention is as follows. The disturbance estimation means estimates the magnitude of a disturbance that acts on the actuator means (a bearing friction, an elastic force of an FPC which connects the actuator means to an electronic circuit board, an inertial force resulting from a shock or a vibration applied from the outside or the like) based on the driving signal applied to the driving means for the actuator means and the voltage signal detected from the actuator means. Here, the disturbance estimation means does not generate the disturbance estimation signal based only on the integral signal of the deviation signal which indicates the difference between the voltage estimation signal and the voltage signal but generates the disturbance estimation signal by using not only the integral signal of the deviation signal but also the proportional signal of the deviation signal and adding up the integral signal and the proportional signal at a certain ratio [$\tau dest = k_1 \cdot a + k_2 \cdot b$]. By doing so, the phase delay of the disturbance estimation signal relative to the actual disturbance can be decreased to generate the disturbance estimation signal which is made closer to the actual disturbance. The disturbance estimation signal is combined with the position control signal to thereby generate a driving signal so as to cancel the disturbance applied to the actuator means by the disturbance estimation signal having this phase delay suppressed and accurately estimated. By driving the actuator means of the head by the driving signal, it is possible to cancel the disturbance that acts on the actuator means and satisfactorily compensate for the disturbance. Therefore, even if the disturbance changes greatly during a following operation in which the head follows up the target track, the positioning of the head on the target track can be stably controlled.

The first aspect of the invention is described as a disk drive control method as follows.

The disk drive control method comprises the steps of:

generating a position error signal corresponding to a current position of a head from servo information recorded on a disk in advance and detected by the head;

generating a position control signal corresponding to the position error signal;

generating a voltage estimation signal that is an estimate of a voltage signal, which is generated when driving actuator means for positioning the head, based on a driving signal for the actuator means and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a signal obtained by multiplying a proportional signal proportional to the deviation signal by a second coefficient, and thereby generating a disturbance estimation signal;

combining the position control signal and the disturbance estimation signal, and generating the driving signal; and driving the actuator means by the driving signal, and positioning the head relative to the disk.

This disk drive control method exhibits the same function as stated above.

According to a second aspect of the present invention, a disk drive of the present invention comprises a plurality of constituent elements. Namely, the disk drive of the present invention comprises:

actuator means for positioning a head relative to a disk;

driving means for driving the actuator means;

voltage detection means for detecting a voltage generated when driving the actuator means, and for outputting a voltage signal;

disturbance estimation means for estimating a magnitude of a disturbance applied to the head from a driving signal for the driving means and the voltage signal, and for generating a disturbance estimation signal;

position detection means for generating a position error signal corresponding to a current position of the head from servo information recorded on the disk in advance and detected by the head;

position control means for generating a position control means corresponding to the position error signal; and correction means for combining the position control signal with the disturbance estimation signal to generate the driving signal.

Further, the disturbance estimation means comprises:

comparison means for comparing the disturbance estimation signal generated by the disturbance estimation means with the voltage signal, and for outputting a deviation signal;

filter means for cutting off a high frequency component of a proportional signal which is proportional to the deviation signal, and for generating a filter output signal; and addition means for adding a signal obtained by multiplying an integral signal, obtained by integrating the deviation signal, by a first coefficient and a signal obtained by multiplying the filter output signal by a second coefficient, and for generating the disturbance estimation signal.

The function of the second aspect of the invention is basically equal to that of the first aspect of the invention stated above. By adding the filter means to the disturbance estimation means, noise can be decreased. The filter means cuts off the high frequency component of the proportional signal and generates a filter output signal. The high frequency component of the integral signal is, on the other hand, cut off in the process of integrating the deviation signal. This is because the integrator itself serves as a kind of a high frequency cut-off filter. Therefore, the disturbance estimation signal obtained by combining the integral signal with the filter output signal is a signal from which a high frequency component is eliminated and which has less noise. In addition, the stability of the overall positioning control system when the disturbance estimation means is applied to the control system can be improved.

The second aspect of the invention is described as a disk drive control method as follows.

The disk drive control method comprises the steps of:

generating a position error signal corresponding to a current position of a head from servo information recorded on a disk in advance and detected by the head;

generating a position control signal corresponding to the position error signal;

generating a voltage estimation signal that is an estimate of a voltage signal, which is generated when driving actuator means for positioning the head, based on a driving signal for the actuator means and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a filter output signal obtained by cutting off a high frequency component of a proportional signal proportional to the deviation signal by a second coefficient, and thereby generating a disturbance estimation signal;

combining the position control signal and the disturbance estimation signal, and generating the driving signal; and driving the actuator means by the driving signal, and positioning the head relative to the disk.

This disk drive control method exhibits the same function as that stated above.

In the first or second aspect of the invention, the disk drive is preferably constituted as follows. The disturbance estimation means comprises:

comparison means which inputs the voltage signal output from the voltage detection means;

first multiplication means for multiplying the driving signal by a coefficient consisting of a first transfer function;

second multiplication means for multiplying an output of the comparison means by a coefficient consisting of a second transfer function;

first integral means for integrating the output of the comparison means; and second integral means for integrating a value obtained by subtracting an addition value, obtained by adding an output of the second multiplication means and an output of the first integral means, from an output of the first multiplication means.

It is also preferable that the comparison means compares an output of the second integral means with the voltage signal, and outputs a difference between the output of the second integral means and the voltage signal to the second multiplication means and the first integral means.

The function of this constitution is as follows. The output of the first multiplication means which inputs the driving signal becomes a driving torque estimation signal which corresponds to a driving torque that acts on the actuator means. The output of the second integral means becomes a voltage estimation signal for the voltage signal detected by the voltage detection means. The deviation signal output from the comparison means which calculates the difference between the voltage estimation signal from the second integral means and the voltage signal is applied to the first integral means and the second multiplication means. An addition of the output of the second multiplication means and that of the first integral means is subtracted from the output of the first multiplication means and the subtraction result is applied to the second integral means. The signal obtained by adding the integral signal, which is obtained by integrating the deviation signal and the proportional signal proportional to the deviation signal at a certain ratio becomes the disturbance estimation signal.

Consequently, the generated disturbance estimation signal corresponds to an accurate estimate of the disturbance that acts on the actuator means. By conducting feed-forward control so as to cancel the disturbance using the disturbance estimation signal thus accurately estimated, satisfactory compensation for the disturbance during the following operation can be made. Even if the disturbance changes greatly during the following operation, the positioning of the head on the target track can be stably controlled to improve positioning accuracy.

According to a third aspect of the present invention, a disk drive of the present invention comprises a plurality of constituent elements. Namely, the disk drive comprises:

actuator means for positioning a head relative to a disk;

driving means for driving the actuator means;

voltage detection means for detecting a voltage generated when driving the actuator means, and for outputting a voltage signal;

position detection means for generating a position error signal corresponding to a current position of the head from servo information recorded on the disk in advance and detected by the head;

position control means for generating a position control means corresponding to the position error signal;

disturbance estimation means for estimating a magnitude of a disturbance applied to the head from the position control signal and the voltage signal, and for generating a disturbance estimation signal; and correction means for combining the position control signal with the disturbance estimation signal to generate the driving signal.

Further, the disturbance estimation means comprises:

comparison means for comparing the disturbance estimation signal generated by the disturbance estimation means with the voltage signal, and for outputting a deviation signal; and addition means for adding a signal obtained by multiplying an integral signal, obtained by integrating the deviation signal, by a first coefficient and a signal obtained by multiplying a proportional signal proportional to the deviation signal by a second coefficient, and for generating the disturbance estimation signal.

The function of the third aspect of the invention is as follows. While the elements input to the disturbance estimation means are the voltage signal and the driving signal in the first aspect of the invention, the voltage signal and the position control signal are input to the disturbance estimation means. The disturbance estimation means accurately estimates the magnitude of the disturbance that acts on the actuator means based on the position control signal from the position control means and the voltage signal detected from the actuator means. Here, the disturbance estimation means does not generate the disturbance estimation signal based only on the integral signal of the deviation signal which indicates the difference between the voltage estimation signal and the voltage signal but generates the disturbance estimation signal by using not only the integral signal of the deviation signal but also the proportional signal of the deviation signal and adding up the integral signal and the proportional signal at a certain ratio [$\tau$dest=$k_1 \cdot a + k_2 \cdot b$]. By doing so, the phase delay of the disturbance estimation signal relative to the actual disturbance can be decreased to generate the disturbance estimation signal which is made closer to the actual disturbance. The disturbance estimation signal is combined with the position control signal to thereby generate a driving signal so as to cancel the disturbance applied to the actuator means by the disturbance estimation signal having this phase delay suppressed and accurately estimated. By driving the actuator means of the head by the driving signal, the disturbance that acts on the actuator means can be cancelled and satisfactory compensation for the disturbance can be made. Therefore, even if the disturbance changes greatly during a following operation in which the head follows up the target track, the positioning of the head on the target track can be stably controlled.

The third aspect of the invention is described as a disk drive control method as follows.

The disk drive control method comprises the steps of:

generating a position error signal corresponding to a current position of a head from servo information recorded on a disk in advance and detected by the head;

generating a position control signal corresponding to the position error signal;

generating a voltage estimation signal that is an estimate of a voltage signal, which is generated when driving actuator means for positioning the head, based on a driving signal for the actuator means and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a signal obtained by multiplying a proportional signal proportional to the deviation signal by a second coefficient, and thereby generating a disturbance estimation signal;

combining the position control signal and the disturbance estimation signal, and generating the driving signal; and driving the actuator means by the driving signal, and positioning the head relative to the disk.

This disk drive control method exhibits the same function as that stated above.

According to a fourth aspect of the present invention, a disk drive of the present invention comprises:

actuator means for positioning a head relative to a disk;

driving means for driving the actuator means;

voltage detection means for detecting a voltage generated when driving the actuator means, and for outputting a voltage signal;

position detection means for generating a position error signal corresponding to a current position of the head from servo information recorded on the disk in advance and detected by the head;

position control means for generating a position control means corresponding to the position error signal;

disturbance estimation means for estimating a magnitude of a disturbance applied to the head from the position control signal and the voltage signal, and for generating a disturbance estimation signal; and correction means for combining the position control signal with the disturbance estimation signal to generate the driving signal.

Further, the disturbance estimation means comprises:

comparison means for comparing the disturbance estimation signal generated by the disturbance estimation means with the voltage signal, and for outputting a deviation signal;

filter means for cutting off a high frequency component of a proportional signal proportional to the deviation signal, and for generating a filter output signal; and addition means for adding a signal obtained by multiplying an integral signal, which is obtained by integrating the deviation signal, by a first coefficient and a signal obtained by multiplying the filter output signal by a second coefficient, and for generating the disturbance estimation signal.

The function of the fourth aspect of the invention is basically equal to that of the third aspect of the invention stated above. By adding the filter means to the disturbance estimation means, noise can be decreased. The filter means cuts off the high frequency component of the proportional signal and generates a filter output signal. The high frequency component of the integral signal is, on the other hand, cut off in the process of integrating the deviation signal. This is because the integrator itself serves as a kind of a high frequency cut-off filter. Therefore, the disturbance estimation signal obtained by combining the integral signal with the filter output signal is a signal from which a high frequency component is eliminated and which has less noise. In addition, the stability of the overall positioning control system when the disturbance estimation means is applied to the control system can be improved.

The fourth aspect of the invention is described as a disk drive control method as follows.

The disk drive control method comprises the steps of:

generating a position error signal corresponding to a current position of a head from servo information recorded on a disk in advance and detected by the head;

generating a position control signal corresponding to the position error signal;

generating a voltage estimation signal that is an estimate of a voltage signal, which is generated when driving actuator means for positioning the head, based on a driving signal for the actuator means and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a signal obtained by multiplying a filter output signal obtained by cutting off a high frequency component of a proportional signal proportional to the deviation signal by a second coefficient, and thereby generating a disturbance estimation signal;

combining the position control signal and the disturbance estimation signal, and generating the driving signal; and driving the actuator means by the driving signal, and positioning the head relative to the disk.

This disk drive control method exhibits the same function as that stated above.

In the third or fourth aspect of the invention, the disk drive is preferably constituted as follows.

The disturbance estimation means comprises:

comparison means which inputs the voltage signal detected by the voltage detection means;

first multiplication means for multiplying the position control signal by a coefficient consisting of a first transfer function;

second multiplication means for multiplying an output of the comparison means by a coefficient consisting of a second transfer function;

first integral means for integrating the output of the comparison means; and second integral means for integrating a value obtained by subtracting an addition value, obtained by adding an output of the second multiplication means and an output of the first integral means, from an output of the first multiplication means, and the comparison means compares an output of the second integral means with the voltage signal, and outputs a difference between the output of the second integral means and the voltage signal to the second multiplication means and the first integral means. This constitution is characterized in that the position control signal is input to the first multiplication means.

The function of this constitution is as follows. The output of the first multiplication means which inputs the position control signal becomes a driving torque estimation signal which corresponds to a driving torque that acts on the actuator means. The output of the second integral means becomes a voltage estimation signal for the voltage signal detected by the voltage detection means. The deviation signal output from the comparison means which calculates the difference between the voltage estimation signal from the second integral means and the voltage signal is applied to the first integral means and the second multiplication means. An addition of the output of the second multiplication means and that of the first integral means is subtracted from the output of the first multiplication means and the subtraction result is applied to the second integral means. The signal obtained by adding the integral signal, which is obtained by integrating the deviation signal and the proportional signal proportional to the deviation signal at a certain ratio becomes the disturbance estimation signal.

Consequently, the generated disturbance estimation signal corresponds to an accurate estimate of the disturbance that acts on the actuator means. By conducting feed-forward control so as to cancel the disturbance using the disturbance estimation signal thus accurately estimated, satisfactory compensation for the disturbance during the following operation can be made. Even if the disturbance changes greatly during the following operation, the positioning of the head on the target track can be stably controlled to improve positioning accuracy.

Furthermore, it is unnecessary to add the first integral means and the second multiplication means as required in the above-stated aspects, so that means for the addition can be omitted and the constitution of the disk drive can be thereby simplified.

In each of the above-mentioned aspects of the invention, it is preferable that a ratio $k_2/k_1$ of the first coefficient $k_1$ and the second coefficient $k_2$ be set to substantially satisfy $\omega o^2/(\omega o^2 - \omega d^2)$, where $\omega o$ is an estimation frequency of the disturbance estimation means and $\omega d$ is a disturbance frequency.

By so setting, the phase delay of the disturbance estimation signal relative to the disturbance can be made substantially zero and the disturbance estimation signal is, therefore, an extremely accurate estimate of the disturbance.

When the first coefficient is set at 1, the number of multipliers and adders can be decreased, thus realizing the simplified constitution.

The disk drive is preferably constituted so that a control band of the disturbance estimation means is set wider than a control band of the position control means.

The function of this constitution is as follows. To widen the control band of the positioning control system means to set a proportional gain large. However, because of the restriction of the sampling frequency of the sector servo of the disk drive or the inherent mechanical resonance frequency, the control band of the positioning control system has an upper limit. The disturbance estimation means is not influenced by the sampling frequency of the sector servo of the disk drive. Therefore, the control band (estimation frequency) of the disturbance estimation means can be set higher than that of the positioning control system. As a result, the head is allowed to accurately follow up the target track over the higher control band.

The technique described thus far can be advantageously developed to the loading/unloading control of the head relative to the disk. Examples of the loading/unloading control will next be described.

A disk drive of the present invention comprises:

actuator means for loading and unloading a head to and from a disk;

driving means for driving the actuator means;

voltage detection means for detecting a voltage generated when driving the actuator means, and for outputting a voltage signal;

disturbance estimation means for estimating a magnitude of a disturbance applied to the head from a driving signal for the driving means and the voltage signal, and for generating a disturbance estimation signal;

velocity control means for generating a velocity control signal from a velocity instruction signal and the voltage signal; and correction means for combining the velocity control signal and the disturbance estimation signal, and for thereby generating the driving signal.

Further, the disturbance estimation means comprises:

comparison means for comparing the disturbance estimation signal generated by the disturbance estimation means with the voltage signal, and for outputting a deviation signal; and addition means for adding a signal obtained by multiplying an integral signal, which is obtained by integrating the deviation signal, by a first coefficient and a signal obtained by multiplying a proportional signal proportional to the deviation signal by a second coefficient, and for generating the disturbance estimation signal.

The voltage signal is a differential of a position and includes velocity information. The velocity control signal is generated from the difference between the velocity instruction signal and the voltage signal. To cancel the disturbance applied from such a head rest member as a ramp block, the magnitude of the disturbance is estimated. To estimate the magnitude of this disturbance, two elements are employed. One element is a voltage signal obtained as a result of detecting a voltage generated when driving the actuator means. The other element is a driving signal for driving means for driving the actuator means. The driving signal for the driving means may be either input to the driving means or output from the driving means. Alternatively, a position control signal based on which the driving signal is generated may be employed instead of the driving signal for the driving means.

The disturbance estimation means for estimating the magnitude of the disturbance is provided. This disturbance estimation means inputs the voltage signal detected by the voltage detection means and the driving signal (including the velocity control signal) for the driving means, and generates a disturbance estimation signal. The disturbance estimation signal generated based on the two elements is an accurate estimate of the magnitude of the disturbance that actually acts on the head.

As stated above, the disturbance estimation signal estimated is combined with the velocity control signal to generate the driving signal, and the head actuator means is driven using the driving signal. By doing so, the disturbance that acts on the head is satisfactorily cancelled. Therefore, even if the disturbance on the head rest member changes greatly, stable velocity control can be ensured.

Besides these respects, the present invention takes the following respects into account.

The disturbance estimation means generates a voltage estimation signal which corresponds to an input voltage signal, compares this voltage estimation signal with the input voltage signal, and generates a deviation signal that indicates a difference between the voltage estimation signal and the voltage signal. Further, the disturbance estimation means generates an integral signal obtained by integrating this deviation signal and a proportional signal proportional to the deviation signal, feedbacks an addition signal obtained by adding the integral signal and the proportional signal so as to generate the voltage estimation signal, and makes the deviation signal close to zero.

As a basic concept of generating the disturbance estimation signal returned to the correction means, there is a concept of generating the disturbance estimation signal based only on the integral signal. In the case where the disturbance estimation signal is generated based only on the integral signal, the above-stated function can be exhibited to compensate for the disturbance by driving the actuator means based on the driving signal obtained by combining the disturbance estimation signal and the position control signal.

However, in the case where the disturbance estimation signal is generated based only on the integral signal, a phase difference is generated between the disturbance estimation signal and an actual disturbance and the disturbance estimation signal has a phase delay relative to the actual disturbance. When the actuator means is driven by the driving signal based on the disturbance estimation signal that has the phase delay, there is no avoiding the influence of the phase delay although the advantage of compensating for the disturbance can be exhibited. Therefore, it still leaves room for improvement. The present invention adds the following means so as to ensure sufficient compensation for the disturbance.

The disturbance estimation means adds the integral signal for the deviation signal and the proportional signal for the deviation signal at a certain ratio and generates a disturbance estimation signal. When a is the integral signal, b is the proportional signa, and k1 and k2 are coefficients that are not zero, the disturbance estimation signal τdest can be expressed by [$\tau dest = k_1 \cdot a + k_2 \cdot b$]. The proportional signal has an advanced phase from that of the integral signal by 90 degrees. Accordingly, an appropriate combination of the integral signal and the proportional signal can decrease the phase delay. Namely, the disturbance estimation signal closer to the actual disturbance can be generated. The correction means combines the disturbance estimation signal in which this phase delay is suppressed with the position control signal to obtain the driving signal, and drives the actuator means by the obtained driving signal. This enables satisfactory, sufficient compensation for the disturbance such as the bearing friction, the elastic force or the inertial force that acts on the actuator means. As a result, even if the change of the disturbance that acts on the actuator means is great during loading or unloading, the positioning of the head on the target track can be stably controlled. In other words, the reliability of the head loading/unloading operation can be improved. This can in turn increase the density of a track and help realize a disk drive having a large storage capacity.

The present invention stated above will be described more concretely.

According to a fifth aspect of the present invention, a disk drive of the present invention comprises a plurality of constituent elements. Namely, the disk drive comprises:

actuator means for loading and unloading a head to and from a disk;

driving means for driving the actuator means;

voltage detection means for detecting a voltage generated when driving the actuator means, and for outputting a voltage signal;

disturbance estimation means for estimating a magnitude of a disturbance applied to the head from a driving signal for the driving means and the voltage signal, and for generating a disturbance estimation signal;

velocity control means for generating a velocity control signal from a velocity instruction signal and the voltage signal; and correction means for combining the velocity control signal and the disturbance estimation signal, and for thereby generating the driving signal.

Further, the disturbance estimation means comprises:

comparison means for comparing the disturbance estimation signal generated by the disturbance estimation means with the voltage signal, and for outputting a deviation signal; and addition means for adding a signal obtained by multiplying an integral signal, which is obtained by integrating the deviation signal, by a first coefficient and a signal obtained by multiplying a proportional signal proportional to the deviation signal by a second coefficient, and for generating the disturbance estimation signal.

In this constitution, the driving signal for the driving means may be either input to the driving means or output from the driving means. The same shall apply hereinafter.

The function of this fifth aspect of the invention is as follows. The disturbance estimation means estimates the magnitude of a disturbance that acts on the actuator means (a bearing friction, an elastic force of an FPC which connects the actuator means to an electronic circuit board, an inertial force resulting from a shock or a vibration applied from the outside or the like) based on the driving signal applied to the driving means for the actuator means and the voltage signal detected from the actuator means. Here, the disturbance estimation means does not generate the disturbance estimation signal based only on the integral signal of the deviation signal which indicates the difference between the voltage estimation signal and the voltage signal but generates the disturbance estimation signal by using not only the integral signal of the deviation signal but also the proportional signal of the deviation signal and adding up the integral signal and the proportional signal at a certain ratio [$\tau dest = k_1 \cdot a + k_2 \cdot b$]. By doing so, the disturbance estimation signal made closer to the actual disturbance can be generated. When the correction means combines the disturbance estimation signal having the phase delay thus suppressed with the velocity control signal and the actuator means is driven by the obtained driving signal, which enables sufficient satisfactory compensation for the disturbance such as the bearing friction, the elastic force or the inertial force that acts on the actuator means. As a result, even if the change of the disturbance that acts on the head rest member is great during loading or unloading, the positioning of the head on the target track can be stably controlled. In other words, the reliability of the head loading/unloading operation can be improved. This can in turn increase the density of a track and help realize a disk drive having a large storage capacity.

The fifth aspect of the invention is described as a disk drive control method as follows.

The disk drive control method comprises the steps of:

generating a velocity control signal corresponding to a velocity instruction;

generating a voltage estimation signal that is an estimate of a voltage signal, which is generated when driving actuator means for loading and unloading a head, based on a driving signal for the actuator means and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a signal obtained by multiplying a proportional signal proportional to the deviation signal by a second coefficient, and thereby generating a disturbance estimation signal;

combining the velocity control signal and the disturbance estimation signal, and generating the driving signal; and driving the actuator means by the driving signal, and loading and unloading the head to and from the disk.

This control method of the disk drive exhibits the same function as stated above.

According to a sixth aspect of the present invention, a disk drive of the present invention comprises a plurality of constituent elements. Namely, the disk drive comprises:

actuator means for loading and unloading a head to and from a disk;

driving means for driving the actuator means;

voltage detection means for detecting a voltage generated when driving the actuator means, and for outputting a voltage signal;

disturbance estimation means for estimating a magnitude of a disturbance applied to the head from a driving signal for the driving means and the voltage signal, and for generating a disturbance estimation signal;

velocity control means for generating a velocity control signal from a velocity instruction signal and the voltage signal; and correction means for combining the velocity control signal and the disturbance estimation signal, and for thereby generating the driving signal.

Further, the disturbance estimation means comprises:

comparison means for comparing the disturbance estimation signal generated by the disturbance estimation means with the voltage signal, and for outputting a deviation signal;

filter means for cutting off a high frequency component of a proportional signal proportional to the deviation signal, and for generating a filter output signal; and addition means for adding a signal obtained by multiplying an integral signal, which is obtained by integrating the deviation signal, by a first coefficient and a signal obtained by multiplying the filter output signal by a second coefficient, and for generating the disturbance estimation signal.

The function of the sixth aspect of the invention is basically equal to that of the fifth aspect of the invention stated above. By adding the filter means to the disturbance estimation means, noise can be decreased. The filter means cuts off the high frequency component of the proportional signal and generates a filter output signal. The high frequency component of the integral signal is, on the other hand, cut off in the process of integrating the deviation signal. This is because the integrator itself serves as a kind of a high frequency cut-off filter. Therefore, the disturbance estimation signal obtained by combining the integral signal with the filter output signal is a signal from which a high frequency component is eliminated and which has less noise. In addition, the stability of the overall positioning control system when the disturbance estimation means is applied to the control system can be improved.

The sixth aspect of the invention is described as a disk drive control method as follows.

The disk drive control method comprises the steps of:

generating a velocity control signal corresponding to a velocity instruction;

generating a voltage estimation signal that is an estimate of a voltage signal, which is generated when driving actuator means for loading and unloading a head, based on a driving signal for the actuator means and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a filter output signal obtained by cutting of a high frequency component of a proportional signal proportional to the deviation signal by a second coefficient, and thereby generating a disturbance estimation signal;

combining the velocity control signal and the disturbance estimation signal, and generating the driving signal; and driving the actuator means by the driving signal, and loading and unloading the head to and from the disk.

This disk drive control method exhibits the same function as that stated above.

In the fifth or sixth aspect of the invention, the disk drive is preferably constituted as follows.

The disturbance estimation means comprises:

comparison means which inputs the voltage signal detected by the voltage detection means;

first multiplication means for multiplying the driving signal by a coefficient consisting of a first transfer function;

second multiplication means for multiplying an output of the comparison means by a coefficient consisting of a second transfer function;

first integral means for integrating the output of the comparison means; and second integral means for integrating a value obtained by subtracting an addition value, which is obtained by adding an output of the second multiplication means and an output of the first integral means, from an output of the first multiplication means, and wherein the comparison means compares an output of the second integral means with the voltage signal, and outputs a difference between the output of the second integral means and the voltage signal to the second multiplication means and the first integral means.

The function of this constitution is as follows. The output of the first multiplication means which inputs the position control signal becomes a driving torque estimation signal which corresponds to a driving torque that acts on the actuator means. The output of the second integral means becomes a voltage estimation signal for the voltage signal detected by the voltage detection means. The deviation signal output from the comparison means which calculates the difference between the voltage estimation signal from the second integral means and the voltage signal is applied to the first integral means and the second multiplication means. An addition of the output of the second multiplication means and that of the first integral means is subtracted from the output of the first multiplication means and the subtraction result is applied to the second integral means. The signal obtained by adding the integral signal, which is obtained by integrating the deviation signal and the proportional signal proportional to the deviation signal at a certain ratio becomes the disturbance estimation signal.

Consequently, the generated disturbance estimation signal corresponds to an accurate estimate of the disturbance that acts on the actuator means. By conducting feed-forward control so as to cancel the disturbance using the disturbance estimation signal thus accurately estimated, it is possible to satisfactorily compensate for the disturbance such as the friction on the head rest member during the loading/unloading operation. Even if the disturbance changes greatly during the loading/unloading operation, it is possible to ensure velocity control stably enough. In other words, the reliability of the head loading/unloading operation can be improved.

According to a seventh aspect of the present invention, a disk drive of the present invention comprises a plurality of constituent elements. Namely, the disk drive comprises:

actuator means for loading and unloading a head to and from a disk;

driving means for driving the actuator means;

voltage detection means for detecting a voltage generated when driving the actuator means, and for outputting a voltage signal;

disturbance estimation means for estimating a magnitude of a disturbance applied to the head from a velocity control signal and the voltage signal, and for generating a disturbance estimation signal;

velocity control means for generating a velocity control signal from a velocity instruction signal and the voltage signal; and correction means for combining the velocity control signal and the disturbance estimation signal, and for thereby generating the driving signal.

Further, the disturbance estimation means comprises:

comparison means for comparing the disturbance estimation signal generated by the disturbance estimation means with the voltage signal, and for outputting a deviation signal; and addition means for adding a signal obtained by multiplying an integral signal, which is obtained by integrating the deviation signal, by a first coefficient and a signal obtained by multiplying a proportional signal proportional to the deviation signal by a second coefficient, and for generating the disturbance estimation signal.

In this seventh aspect of the invention, the disturbance estimation means employs the velocity control signal from the velocity control means instead of the driving signal for the driving means as employed in the sixth aspect of the invention. The function of the seventh aspect is as follows. The disturbance estimation means can accurately estimate the magnitude of the disturbance that acts on the head based on the velocity control signal applied from the velocity control means to the driving means so as to drive the actuator means and the voltage signal detected from the actuator means. The disturbance to be estimated corresponds to the disturbance estimation signal. It is particularly important that the magnitude of the disturbance applied to the head can be accurately specified from the velocity control signal and the voltage signal.

The disturbance estimation signal is combined with the velocity control signal to generate the driving signal so as to cancel the disturbance that acts on the head by the disturbance estimation signal thus accurately estimated, and the head actuator means is driven using the driving signal. By doing so, the disturbance that acts on the head can be satisfactorily cancelled. That is, compensation for such an external force as a friction that acts on the actuator means can be made. Besides, the velocity control directly related to this is conducted. Therefore, even if the disturbance on the head rest member such as a ramp block changes greatly during loading/unloading, sufficient stable velocity control can be ensured. In other words, the reliability of the head loading/unloading operation can be improved.

The seventh aspect of the invention is described as a disk drive control method as follows.

The disk drive control method comprises the steps of:

generating a velocity control signal corresponding to a velocity instruction;

generating a voltage estimation signal that is an estimate of a voltage signal, which is generated when driving actuator means, based on the velocity control signal and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a signal obtained by multiplying a proportional signal proportional to the deviation signal by a second coefficient, and thereby generating a disturbance estimation signal;

combining the velocity control signal and the disturbance estimation signal, and generating the driving signal; and driving the actuator means by the driving signal, and loading and unloading the head to and from the disk.

This disk drive control method exhibits the same function as that stated above.

According to an eighth aspect of the present invention, a disk drive of the present invention comprises a plurality of constituent elements. Namely, the disk drive comprises:

actuator means for loading and unloading a head to and from a disk;

driving means for driving the actuator means;

voltage detection means for detecting a voltage generated when driving the actuator means, and for outputting a voltage signal;

disturbance estimation means for estimating a magnitude of a disturbance applied to the head from a velocity control signal and the voltage signal, and for generating a disturbance estimation signal;

velocity control means for generating a velocity control signal from a velocity instruction signal and the voltage signal; and correction means for combining the velocity control signal and the disturbance estimation signal, and for thereby generating the driving signal.

Further, the disturbance estimation means comprises:

comparison means for comparing the disturbance estimation signal generated by the disturbance estimation means with the voltage signal, and for outputting a deviation signal;

filter means for cutting off a high frequency component of a proportional signal proportional to the deviation signal, and for generating a filter output signal; and addition means for adding a signal obtained by multiplying an integral signal, which is obtained by integrating the deviation signal, by a first coefficient and a signal obtained by multiplying the filter output signal by a second coefficient, and for generating the disturbance estimation signal.

The function of the eighth aspect of the invention is basically equal to that of the seventh aspect of the invention stated above. By adding the filter means to the disturbance estimation means, noise can be decreased. The filter means cuts off the high frequency component of the proportional signal and generates a filter output signal. The high frequency component of the integral signal is, on the other hand, cut off in the process of integrating the deviation signal. This is because the integrator itself serves as a kind of a high frequency cut-off filter. Therefore, the disturbance estimation signal obtained by combining the integral signal with the filter output signal is a signal from which a high frequency component is eliminated and which has less noise. In addition, the stability of the overall positioning control system when the disturbance estimation means is applied to the control system can be improved.

The eighth aspect of the invention is described as a disk drive control method as follows.

The disk drive control method comprises the steps of:

generating a velocity control signal corresponding to a velocity instruction;

generating a voltage estimation signal that is an estimate of a voltage signal, which is generated when driving actuator means, based on the velocity control signal and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a filter output signal obtained by cutting off a high frequency component of a proportional signal proportional to the deviation signal by a second coefficient, and thereby generating a disturbance estimation signal;

combining the velocity control signal and the disturbance estimation signal, and generating the driving signal; and driving the actuator means by the driving signal, and loading and unloading the head to and from the disk.

This disk drive control method exhibits the same function as that stated above.

In the seventh or eighth aspect of the invention, the disk drive is preferably constituted as follows.

The disturbance estimation means comprises:

comparison means which inputs the voltage signal output from the voltage detection means;

first multiplication means for multiplying the position control signal by a coefficient consisting of a first transfer function;

second multiplication means for multiplying an output of the comparison means by a coefficient consisting of a second transfer function;

first integral means for integrating the output of the comparison means; and second integral means for integrating a value obtained by subtracting an addition value, which is obtained by adding an output of the second multiplication means and an output of the first integral means, from an output of the first multiplication means.

It is also preferable that the comparison means compare an output of the second integral means with the voltage signal, and output a difference between the output of the second integral means and the voltage signal to the second multiplication means and the first integral means.

The function of this constitution is as follows. The output of the first multiplication means which inputs the position control signal becomes a driving torque estimation signal which corresponds to a driving torque that acts on the actuator means. The output of the second integral means becomes a voltage estimation signal for the voltage signal detected by the voltage detection means. The deviation signal output from the comparison means which calculates the difference between the voltage estimation signal from the second integral means and the voltage signal is applied to the first integral means and the second multiplication means. An addition of the output of the second multiplication means and that of the first integral means is subtracted from the output of the first multiplication means and the subtraction result is applied to the second integral means. The signal obtained by adding the integral signal, which is obtained by integrating the deviation signal and the proportional signal proportional to the deviation signal at a certain ratio becomes the disturbance estimation signal.

Consequently, the generated disturbance estimation signal corresponds to an accurate estimate of the disturbance that acts on the actuator means. By conducting feed-forward control so as to cancel the disturbance using the disturbance estimation signal thus accurately estimated, it is possible to satisfactorily compensate for the disturbance such as the friction on the head rest member during the loading/unloading operation. Even if the disturbance changes greatly during the loading/unloading operation, it is possible to ensure velocity control stably enough. In other words, the reliability of the head loading/unloading operation can be improved.

Furthermore, it is unnecessary to add the first integral means and the second integral means as required in the above-stated aspects, so that means for the addition can be omitted and the constitution of the disk drive can be thereby simplified.

In each aspect of the invention, it is preferable that a ratio $k_2/k_1$ of the first coefficient $k_1$ and the second coefficient $k_2$ be set to substantially satisfy $\omega o^2/(\omega o^2 - \omega d^2)$, where $\omega o$ is an estimation frequency of the disturbance estimation means and $\omega d$ is a disturbance frequency.

By so setting, the phase delay of the disturbance estimation signal relative to the disturbance can be made substantially zero and the disturbance estimation signal is, therefore, an extremely accurate estimate of the disturbance.

When the first coefficient is set at 1, the number of multipliers and adders can be decreased, thus realizing the simplified constitution.

The disk drive is preferably constituted so that a control band of the disturbance estimation means is set wider than a control band of the velocity control means.

The function of this constitution is as follows. To widen the control band of the positioning control system means to set a proportional gain large. However, because of the restriction of the sampling frequency of the sector servo of the disk drive or the inherent mechanical resonance frequency, the control band of the positioning control system has an upper limit. The disturbance estimation means is not influenced by the sampling frequency of the sector servo of the disk drive. Therefore, the control band (estimation frequency) of the disturbance estimator can be set higher than that of the positioning control system. As a result, the head can be allowed to accurately follow up the target track over the higher control band.

As stated above, the disk drive according to the present invention can accurately detect the disturbance such as the friction applied to the head from the head rest member such as the ramp block during the loading/unloading operation. Therefore, even if the disturbance changes greatly, it is possible to ensure stable velocity control. In other words, the reliability of the head loading/unloading operation can be improved.

Furthermore, the disk drive according to the present invention can realize not only the velocity control during the head loading/unloading operation but also velocity control during a seek operation for allowing the head to move toward the target track at a high velocity without reproducing the servo signal recorded on the disk using the head, thereby making it possible to increase the seek velocity of the disk drive.

The disturbance estimation signal generated by the disturbance estimation means is, in particular, obtained by adding the integral signal of the deviation signal which indicates a difference between the voltage estimation signal and the voltage signal and the proportional signal of the deviation signal at a certain ratio ($\tau$dest=$k_1 \cdot g2 \cdot \alpha/k_2 \cdot g1 \cdot \alpha$), so that the disturbance estimation signal can be made closer to the actual disturbance. As a result, it is possible to sufficiently satisfactorily compensate for the disturbance such as the bearing friction, the elastic force or the inertial force that acts on the actuator means. Even if the disturbance that acts on the actuator means changes greatly during not only the loading/unloading operation but also the following operation of allowing the head to follow up the target track, it is possible to stably perform the loading/unloading operation and stably control the positioning of the head on the target track. Accordingly, even if the influence of the disturbance that acts on the actuator means, on the positioning control system increases as the actuator means is made smaller in size and lighter in weight, it is possible to deal with the positioning with sufficiently high positioning accuracy and realize the disk drive high in track density and large in storage capacity.

The present invention functions most advantageously when being applied to a magnetic disk drive. However, the application of the present invention is not limited to the magnetic disk drive but the present invention can be also applied to other various information storage drives such as an optical disk drive or a magneto-optical disk drive.

As is evident from the above description, the constituent elements may consist of either hardware or software.

The foregoing and other aspects will become apparent from the following description of the invention when considered in conjunction with the accompanying drawing figures.

BRIEF DESCRIPTION OF THE DRAWING FIGURES

Figure 6A:
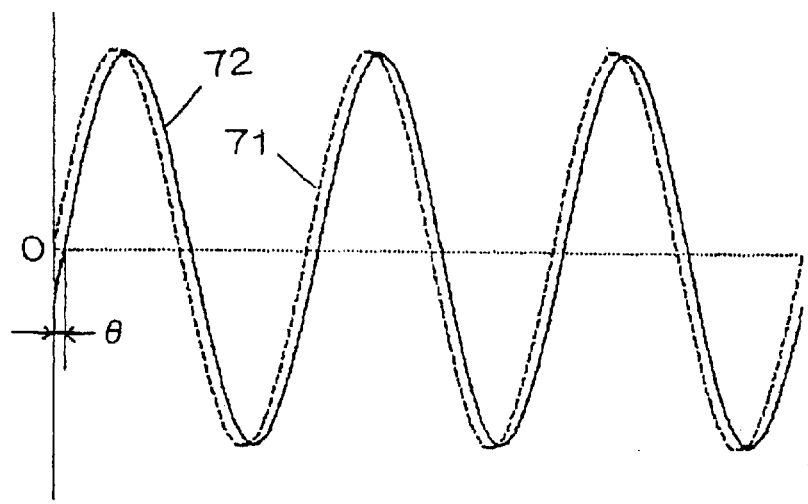
Figure 6B:
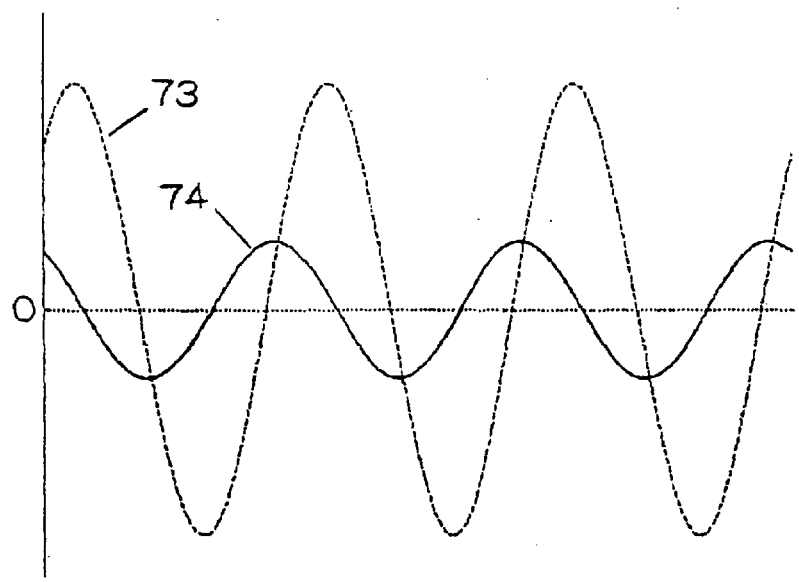
Figure 7:
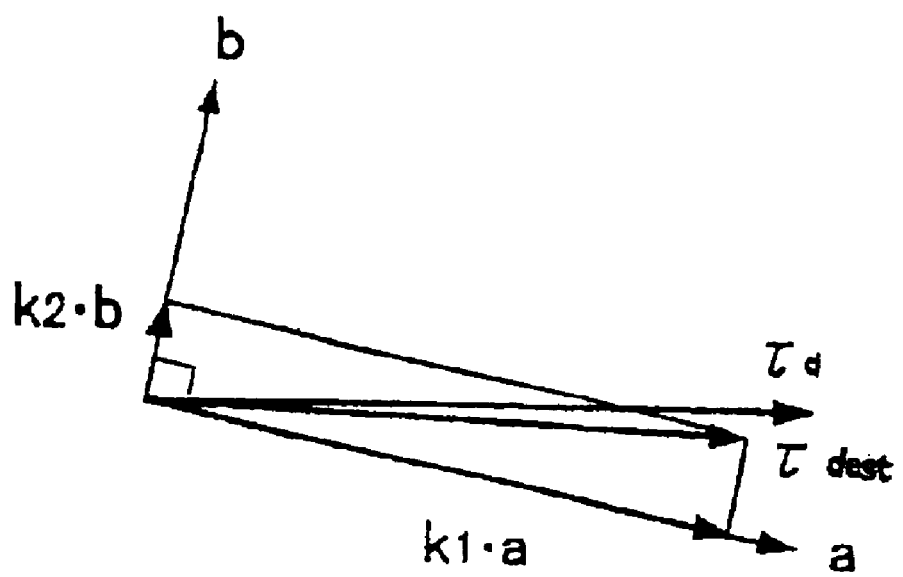
Figure 8A:
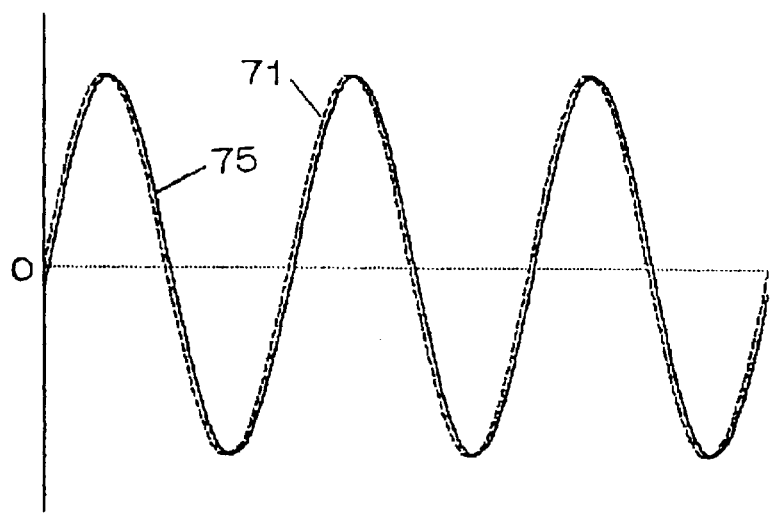
Figure 8B:
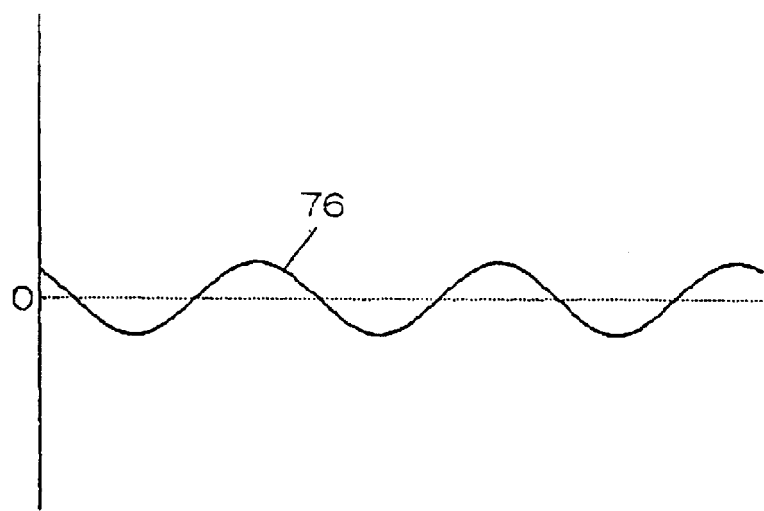
Figure 9:
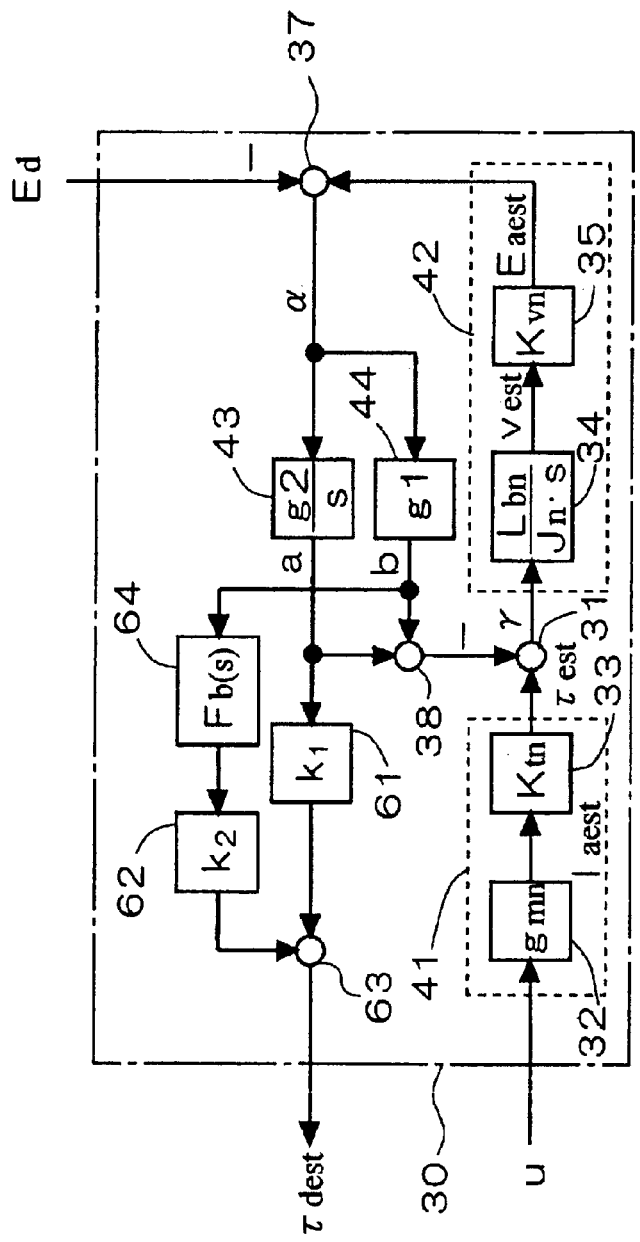
Figure 10A:
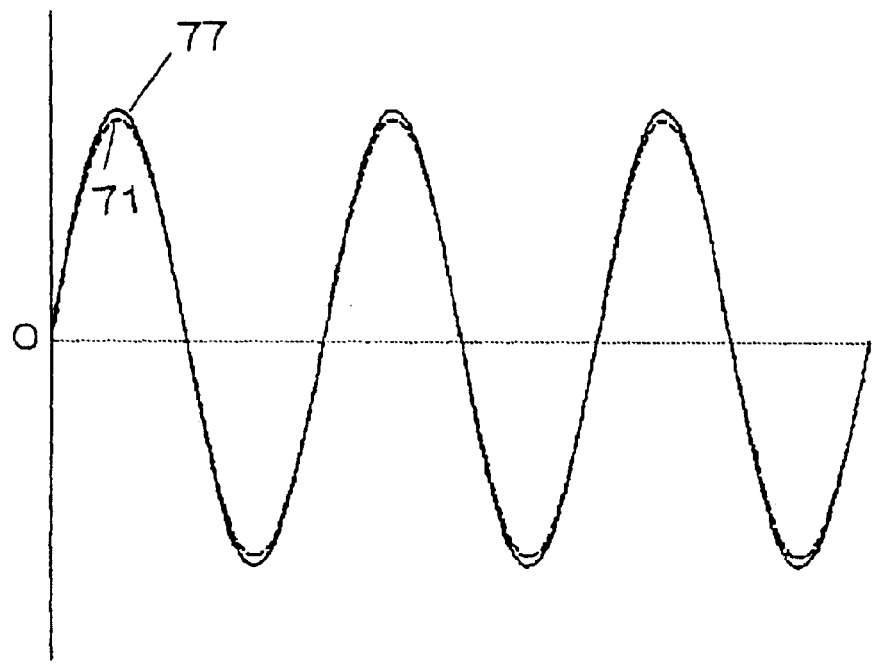
Figure 10B:
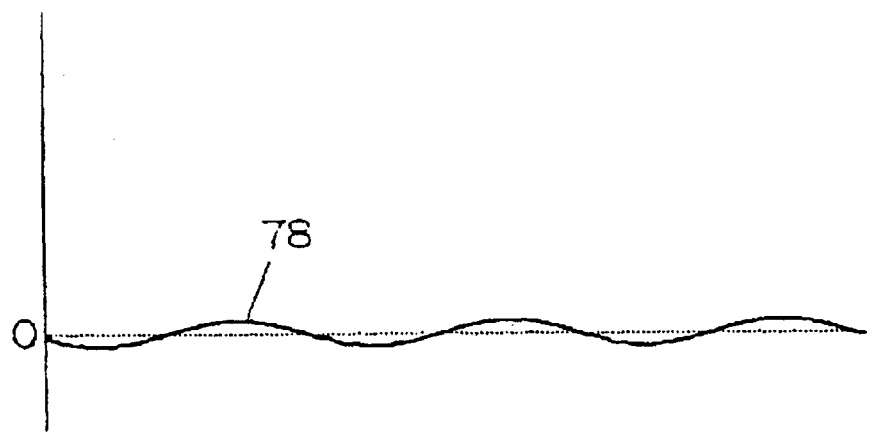
Figure 11:
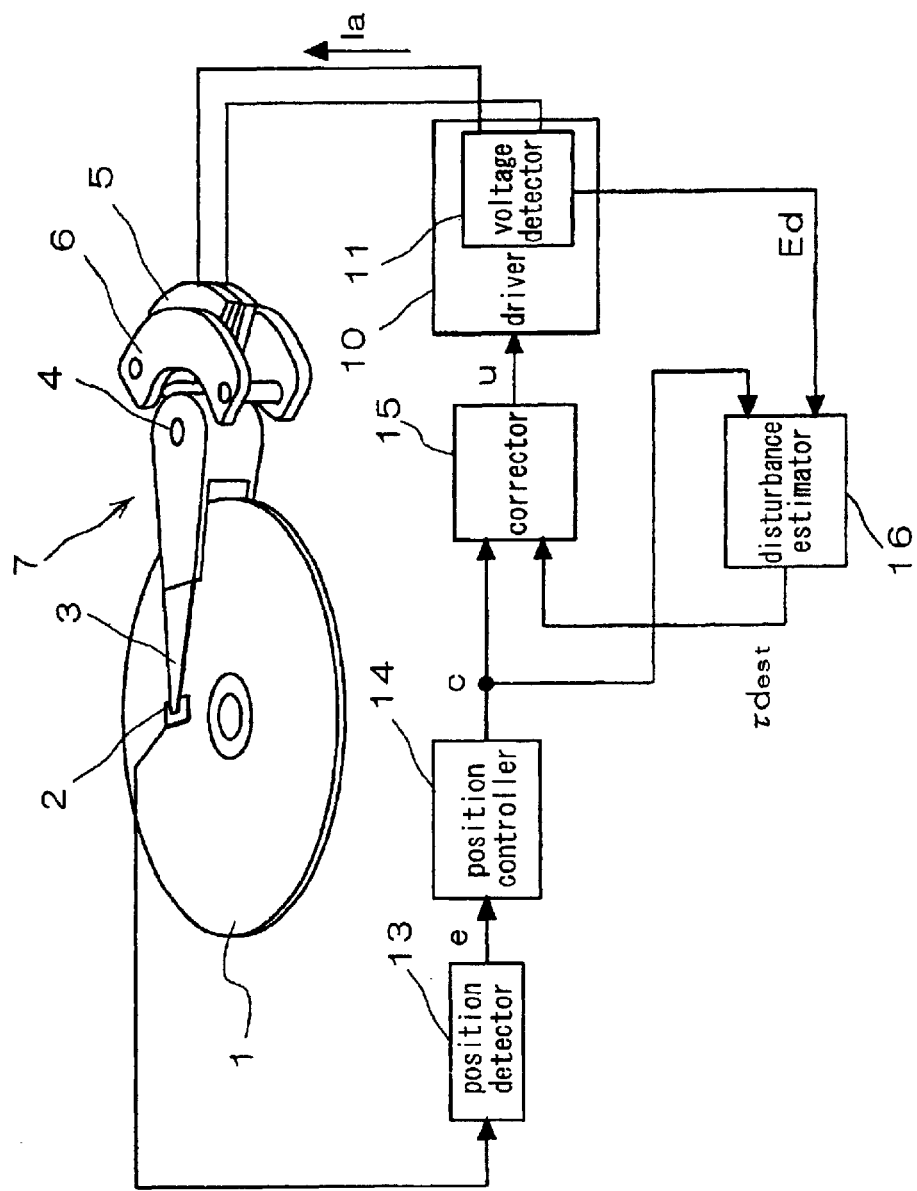
Figure 12:
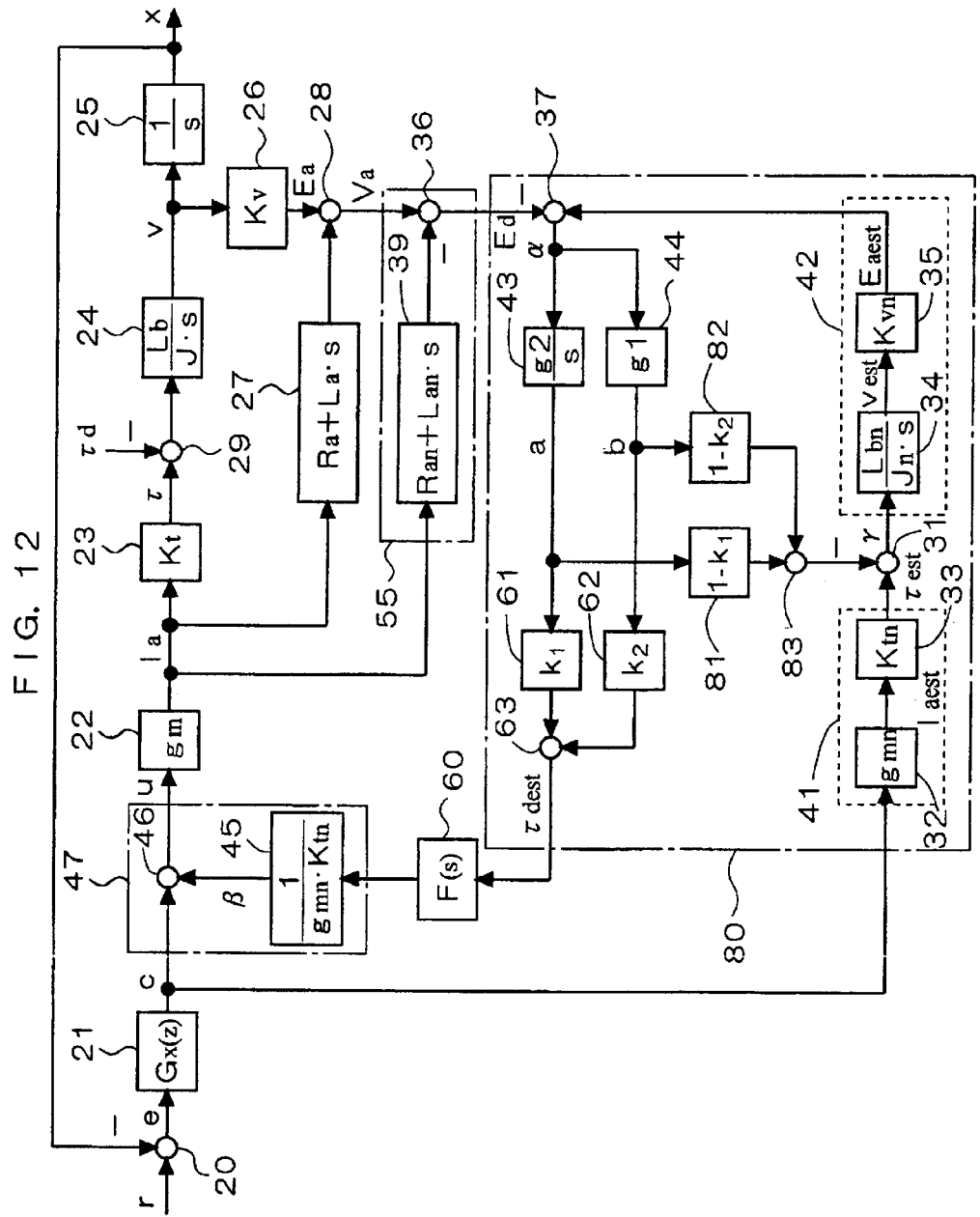
Figure 13:
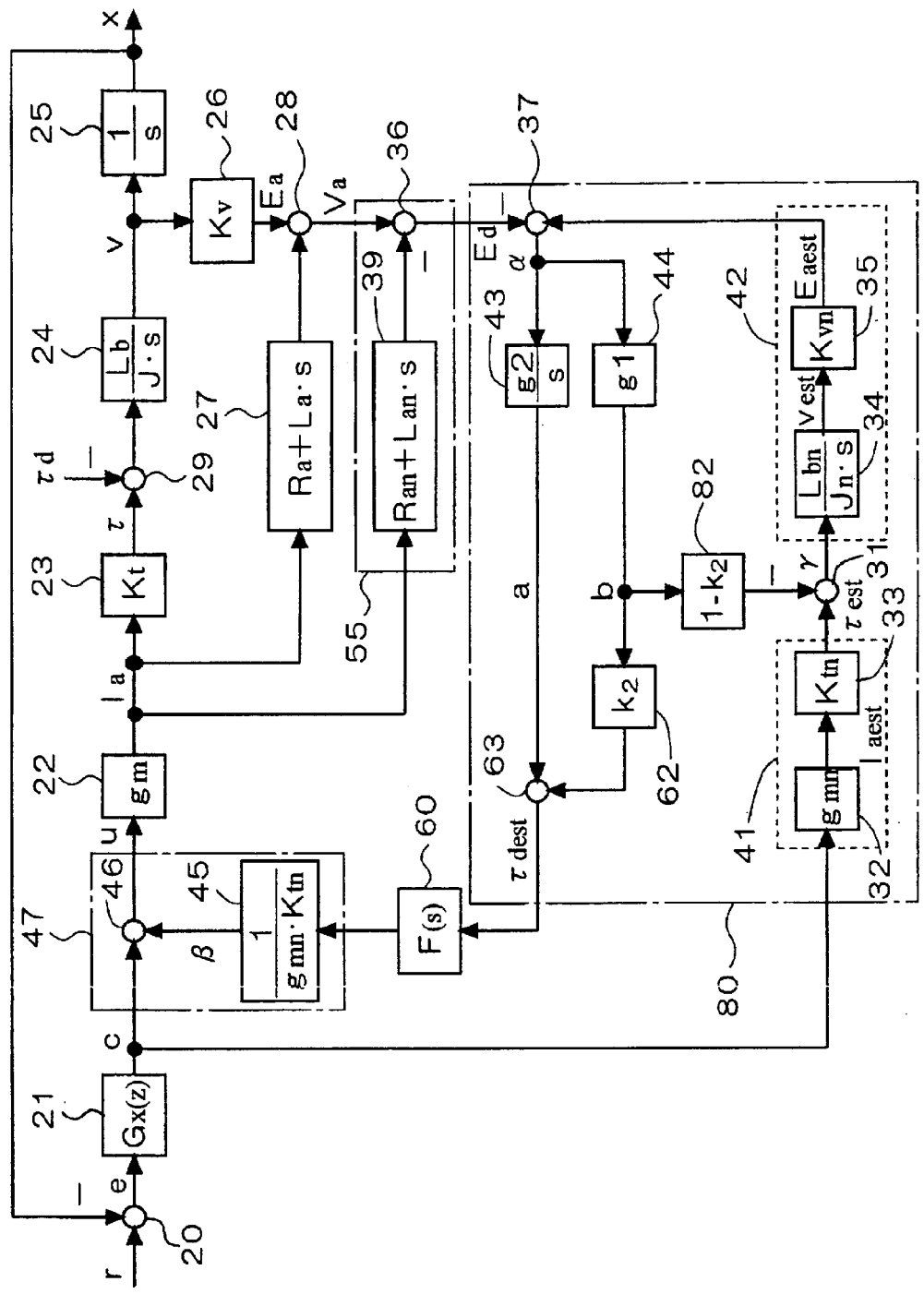
Figure 14:
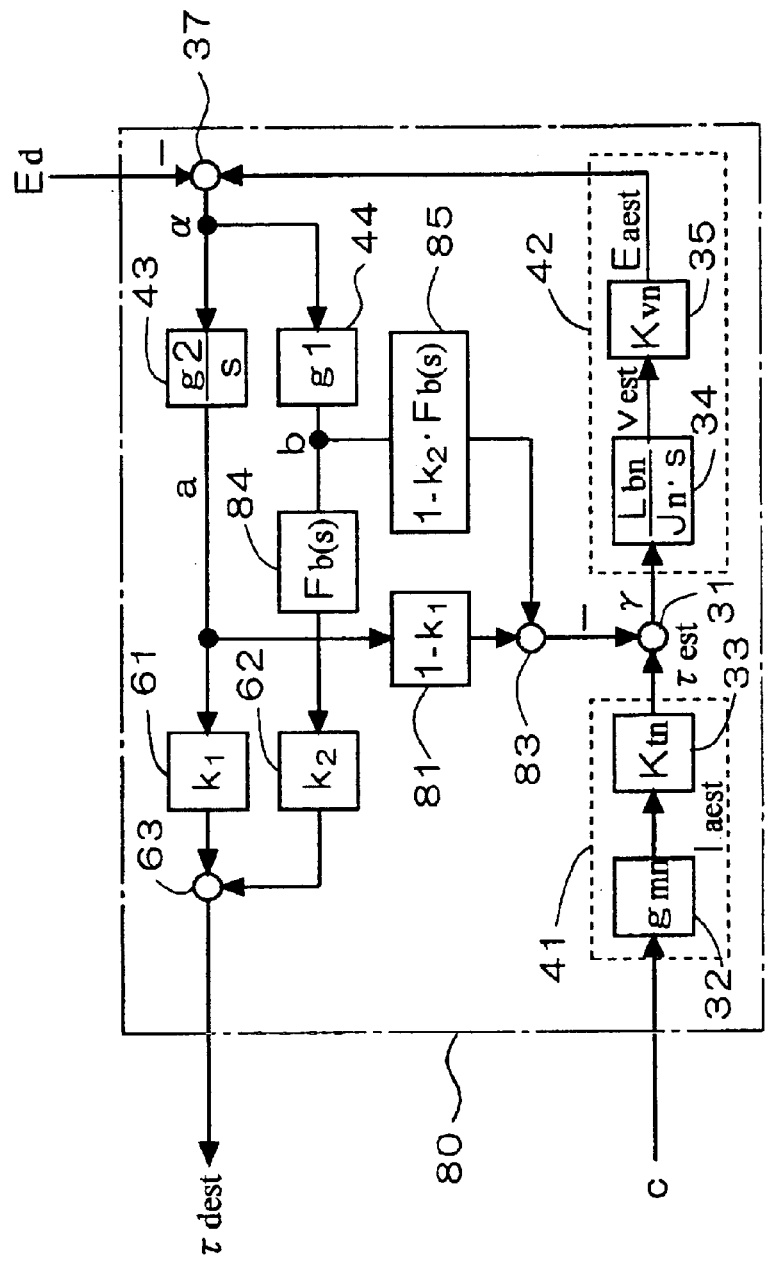
Figure 15:
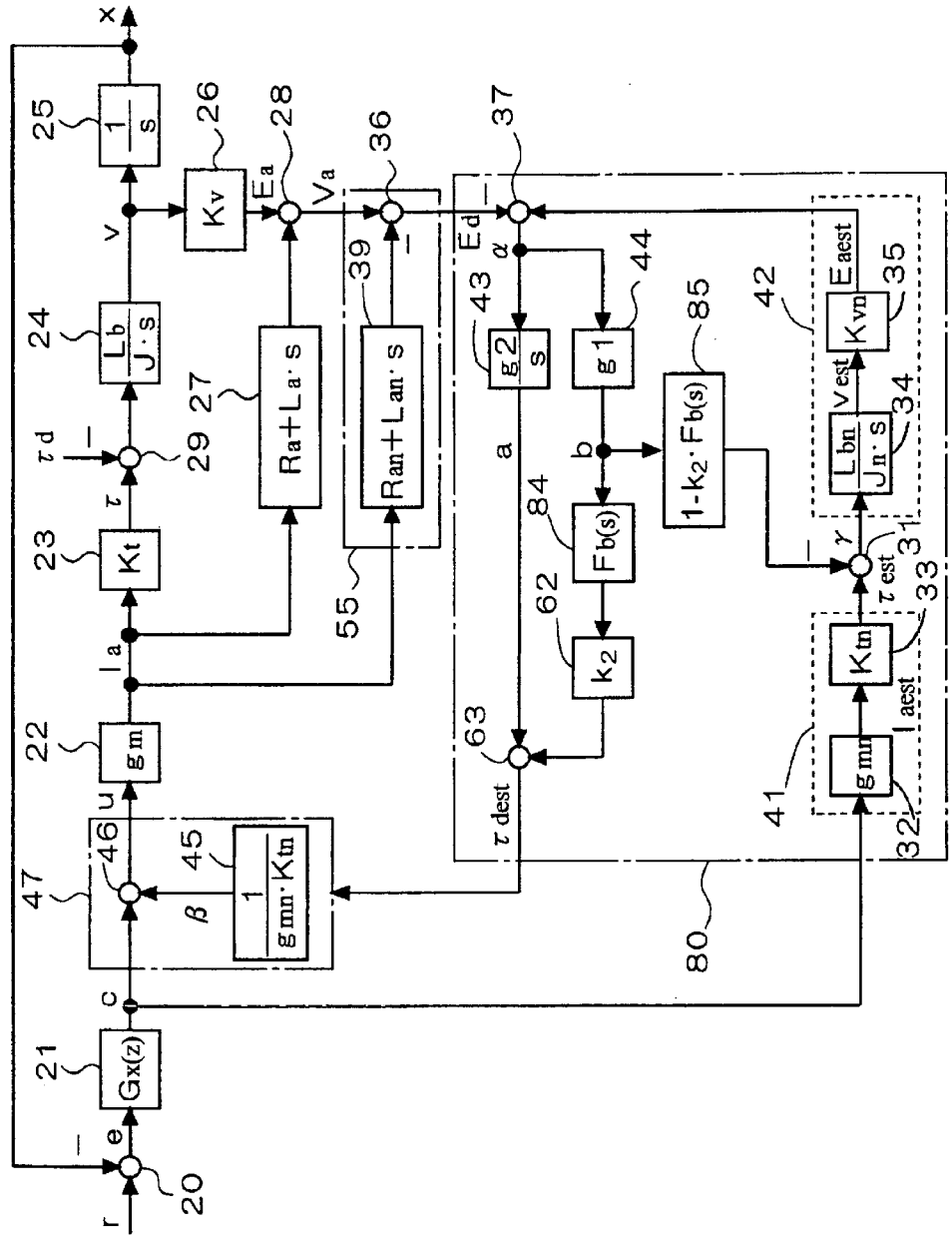
Figure 16:
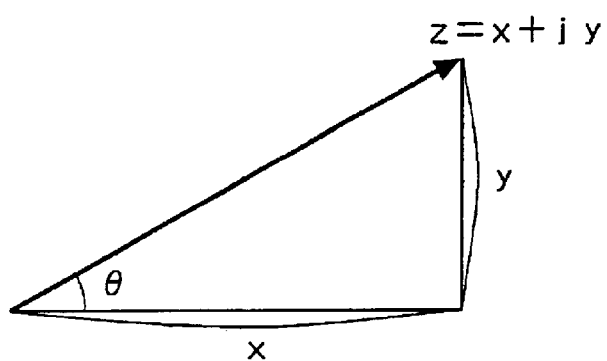
Figure 17:
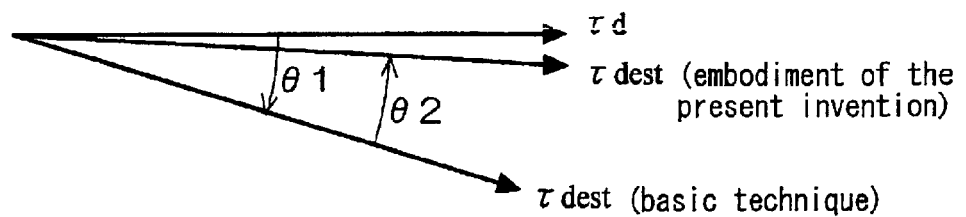
Figure 18:
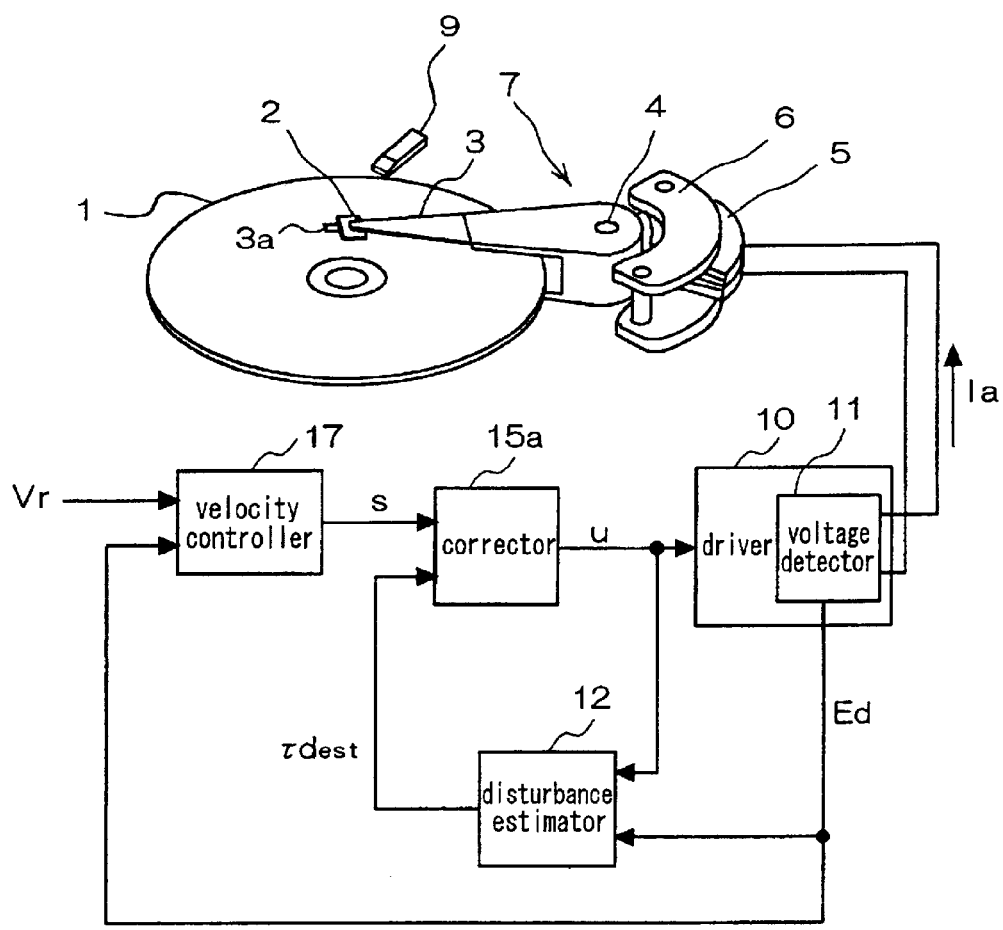
Figure 19:
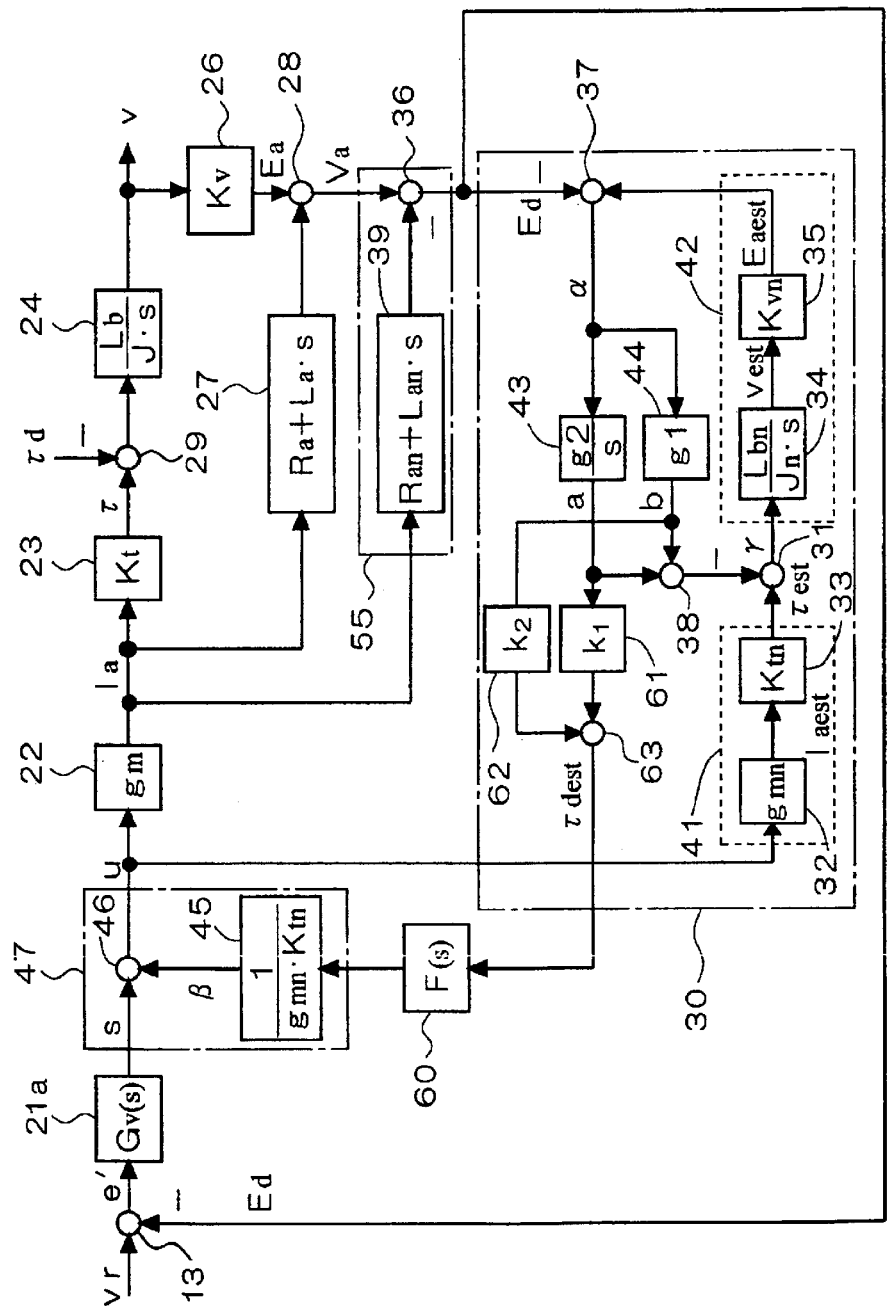
Figure 20:
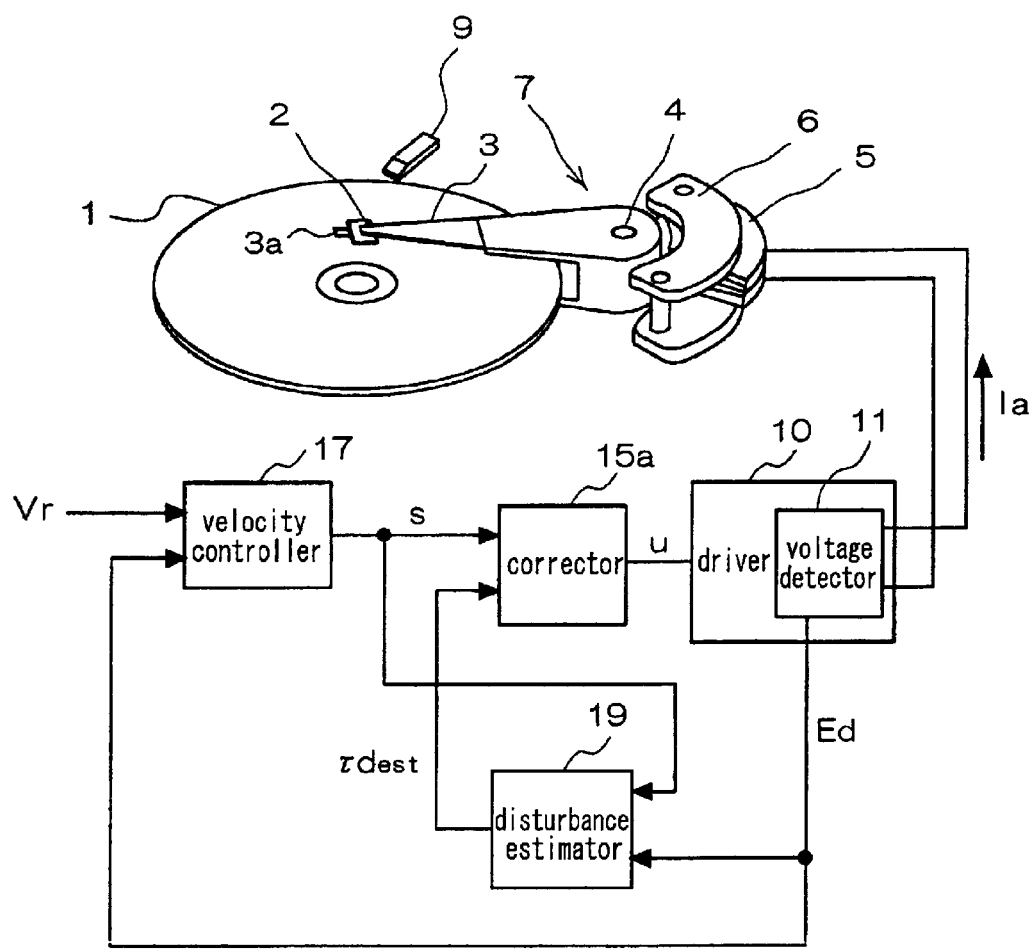
Figure 21:
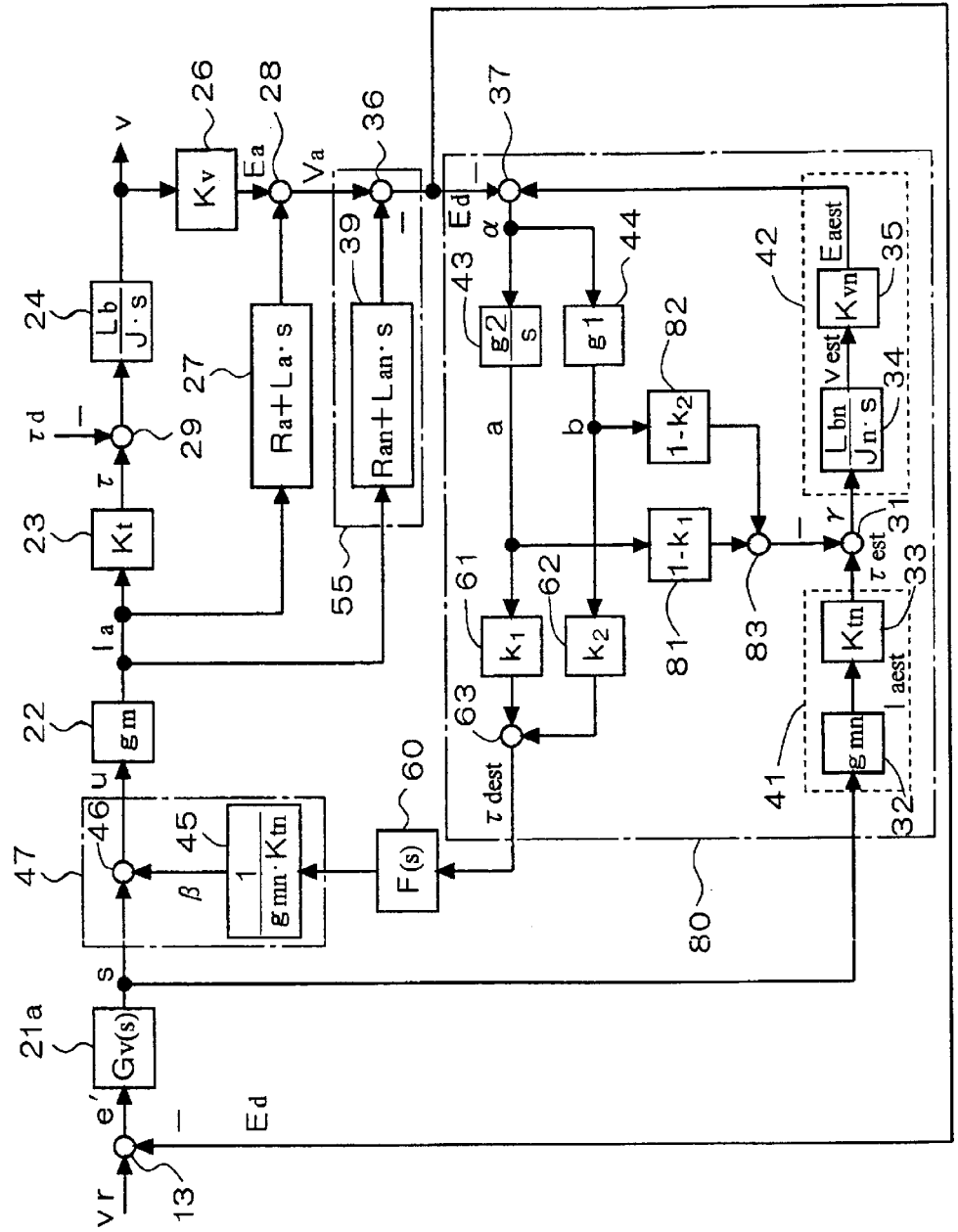
Figure 22:
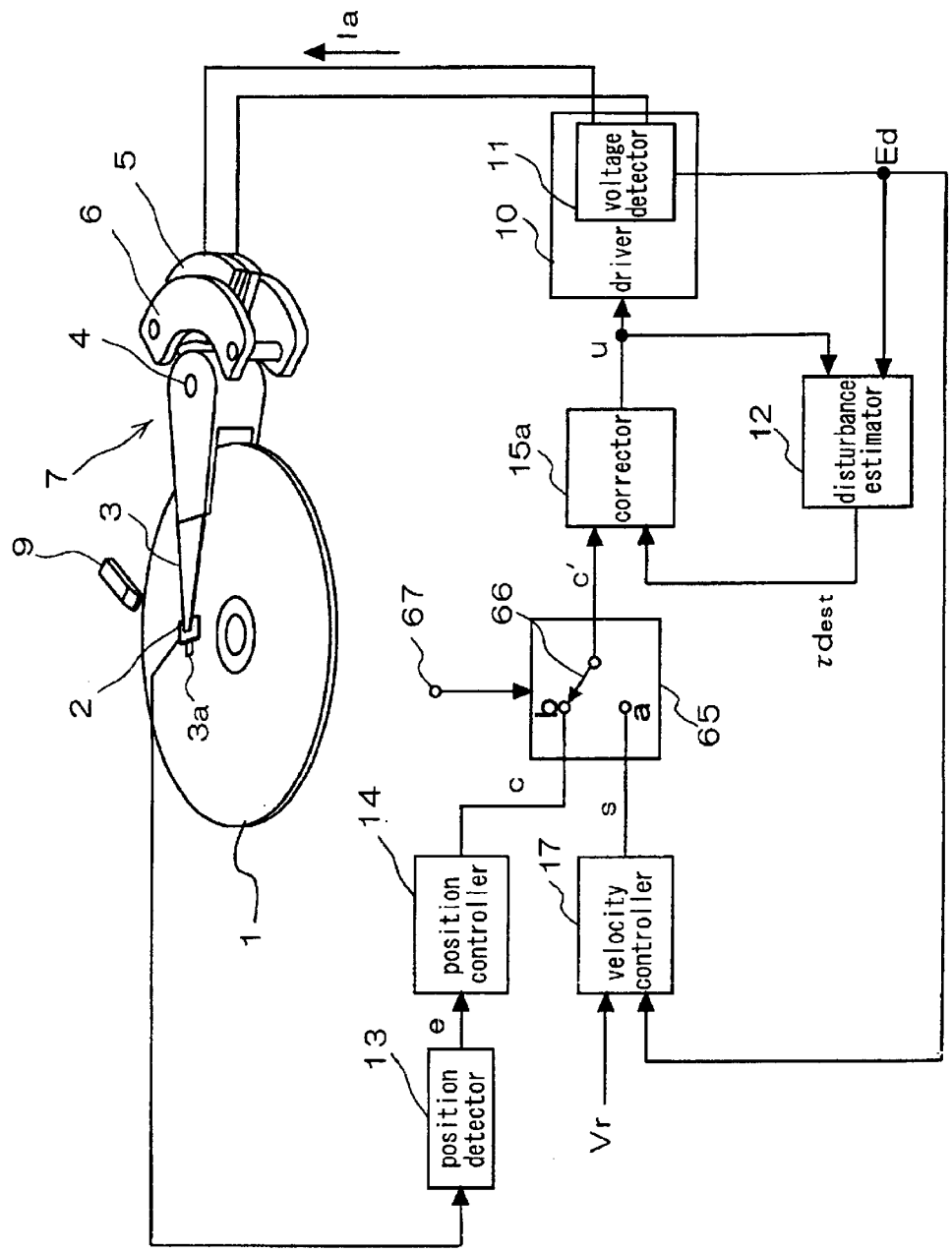
Figure 23:
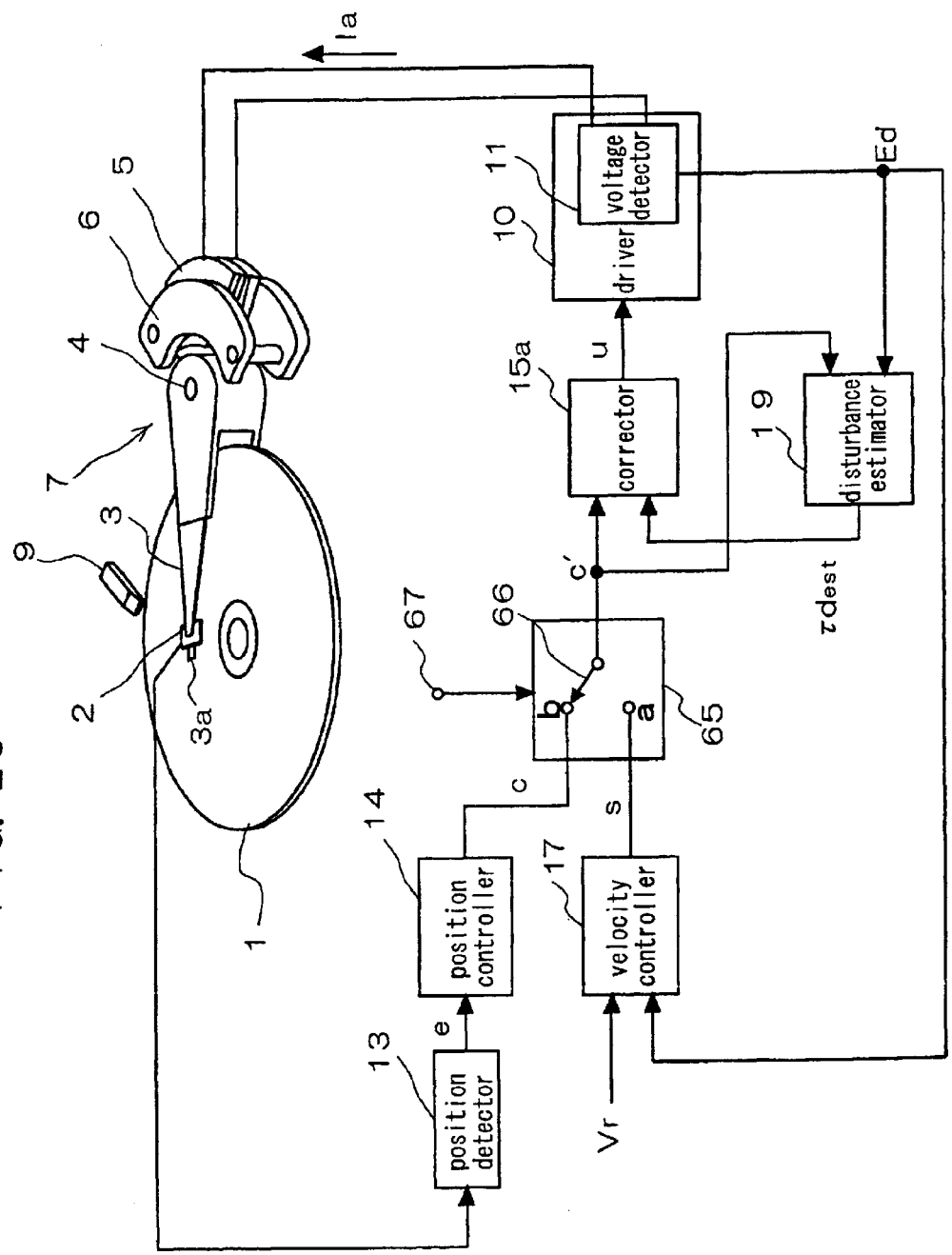

FIG. 6A is a time waveform view of a change of the disturbance applied to the disk drive in the first embodiment according to the present invention and a disturbance estimation signal output from the disturbance estimator in the case where coefficients $k_1$ and $k_2$ are set at 1 and 0 respectively, and FIG. 6B is a time waveform view of track errors when the disturbance estimation signal output from the disturbance estimator is input to a corrector and when the disturbance estimation signal is not input to the corrector, respectively;

FIG. 7 is a vector diagram illustrating phase relationship among respective signal waveforms for describing an operation of the disturbance estimator in the first embodiment according to the present invention;

FIG. 8A is a time waveform view of a change of the disturbance applied to the disk drive in the first embodiment according to the present invention and a disturbance estimation signal output from the disturbance estimator in the case where coefficients $k_1$ and $k_2$ are set at 1 and 0.7, respectively, and FIG. 8B is a time waveform view of track errors when the disturbance estimation signal output from the disturbance estimator is input to a corrector and when the disturbance estimation signal is not input to the corrector, respectively;

FIG. 9 is a block diagram illustrating the configuration of a disturbance estimator which constitutes a disk drive in the second embodiment according to the present invention;

FIG. 10A is a time waveform view of a disturbance estimation signal output from a disturbance estimator in the case where a change of a disturbance that acts on the disk drive in the second embodiment according to the present invention and coefficients k1 and k2 are set at 1 and 1, respectively and a high cut-off frequency fb is set at 500 Hz, and FIG. 10B is a time waveform view of a track error in the case where the disturbance estimation signal output from the disturbance estimator is input to a corrector to cancel the change of the disturbance;

FIG. 11 is a block diagram illustrating the configuration of a disk drive in the third embodiment according to the present invention;

FIG. 12 is a block diagram illustrating the overall configuration of a positioning control system in the third embodiment according to the present invention;

FIG. 13 is a block diagram illustrating a state in which unnecessary blocks are omitted from FIG. 12;

FIG. 14 is a block diagram illustrating the configuration of a disturbance estimator which constitutes a disk drive in the fourth embodiment according to the present invention;

FIG. 15 is a block diagram illustrating a state in which unnecessary blocks are omitted from FIG. 12;

FIG. 16 is an illustration of the relationship between a complex number and an argument thereof;

FIG. 17 is an illustration of a phase shift of a disturbance estimation signal τdest relative to a disturbance τd;

FIG. 18 is a block diagram illustrating the configuration of a disk drive in the fifth embodiment according to the present invention;

FIG. 19 is a block diagram illustrating the overall configuration of a velocity control system in the fifth embodiment according to the present invention;

FIG. 20 is a block diagram illustrating the configuration of a disk drive in the sixth embodiment according to the present invention;

FIG. 21 is a block diagram illustrating the overall configuration of a velocity control system in the sixth embodiment according to the present invention;

FIG. 22 is a block diagram illustrating the configuration of a disk drive in the seventh embodiment according to the present invention; and FIG. 23 is a block diagram illustrating another configuration of the disk drive in the seventh embodiment according to the present invention.

In all these figures, like components are indicated by the same numerals.

DETAILED DESCRIPTION OF THE INVENTION

Preferred embodiments of a disk drive according to the present invention are described hereinafter in detail with reference to the drawings. Components are described with those having like functions indicated by the same reference numerals.

First Embodiment

Figure 1:
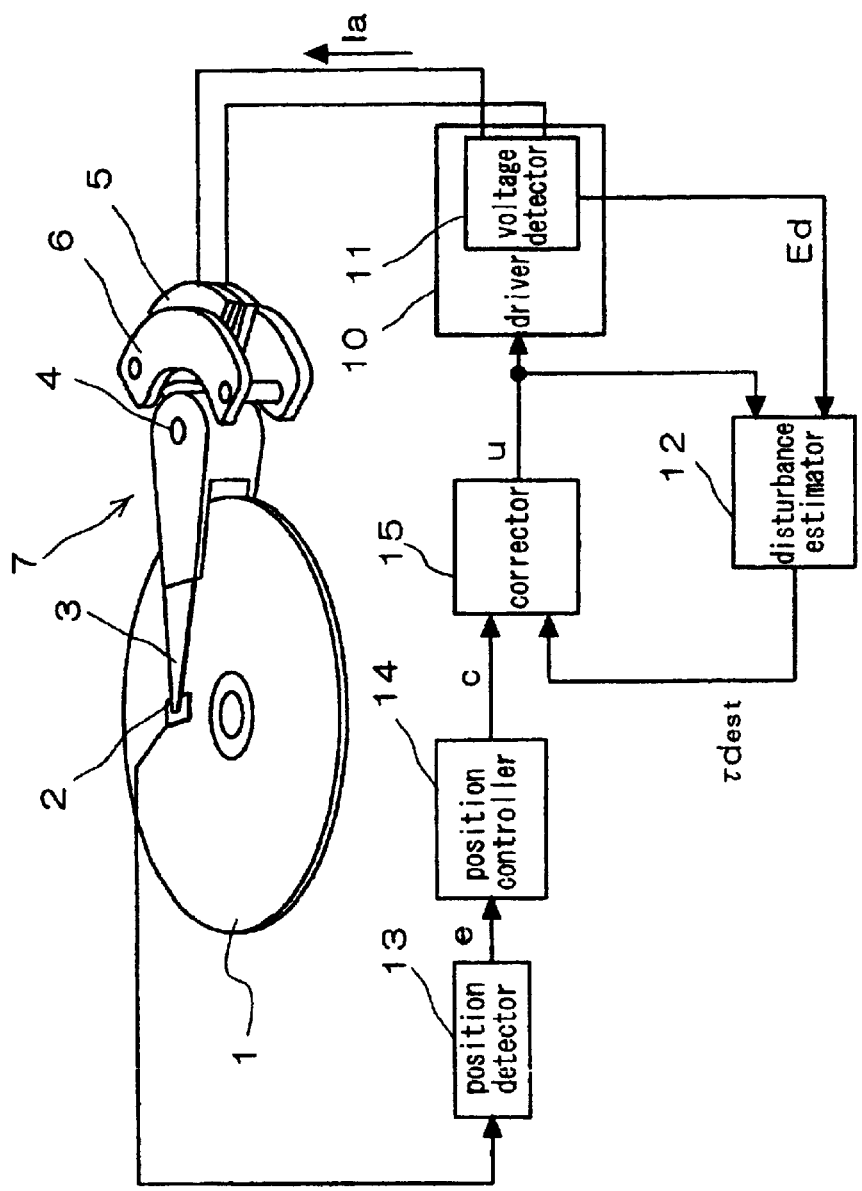
FIG. 1 is a block diagram illustrating the configuration of a disk drive in the first embodiment according to the present invention.

FIG. 1 is a block diagram illustrating the configuration of a disk drive in the first embodiment according to the present invention. In FIG. 1, reference numeral 1 indicates a magnetic disk (hereinafter, "disk"), which is rotated by a spindle motor (not shown). Reference numeral 2 indicates a magnetic head (hereinafter, "head") which records and reproduces data on and from the disk 1, and 3 indicates an arm which rotates the head 2 mounted on one end of the arm 3 around a bearing 4 and thereby moves the head 2 to a target track on the disk 1. Reference numeral 5 indicates a driving coil provided in a rear end of the arm 3, and 6 indicates a stator (yoke) which surface opposite to the driving coil a magnet (permanent magnet, not shown) is arranged on. The stator 6 consists of a pair of yokes opposite each other through a cavity and the magnet is fixedly attached to at least one of the yokes in the cavity. A magnetic flux generated from the magnet arranged on the stator 6 and a magnetic field generated by a current carried to the driving coil 5 interacts with each other, whereby the arm 3 is applied with a rotational force. The arm 3, the bearing 4, the driving coil 5, and the stator 6 constitute an actuator 7 as a whole.

Reference numeral 10 indicates a driver, and 11 indicates a voltage detector included in the driver 10. The voltage detector 11 detects a voltage generated on both ends of the driving coil 5 and outputs a voltage signal Ed. Reference numeral 12 indicates a disturbance estimator which estimates a disturbance (torque) τd that acts on the arm 3 from the voltage signal Ed output from the voltage detector 11 and a driving signal u input to the driver 10, and outputs a disturbance estimation signal τdest.

Track position signals are recorded as servo information on respective sectors of the disk 1 in advance and read by the head 2. A position detector 13 detects a current position of the head 2 based on a position signal read by the head 2 and generates a position error signal e which indicates a difference between the current position of the head 2 and a target track position r. A position controller 14 inputs the position error signal e generated by the position detector 13, performs amplification and phase compensation, and generates a position control signal c. Reference numeral 15 indicates a corrector. The corrector 15 inputs the position control signal c generated by the position controller 14 and the disturbance estimation signal τdest generated by the disturbance estimator 12, performs a correction operation to generate a driving signal u, and outputs the driving signal u to the driver 10.

The driver 10 carries a driving current $I_a$ to the driving coil 5 according to the driving signal u input to the driver 10, to thereby rotate the arm 3 around the bearing 4. The head 2 attached to the tip end of the arm 3 is rotated and moved, and thereby highly accurately positioned on the target track formed at a narrow track pitch.

Figure 2:
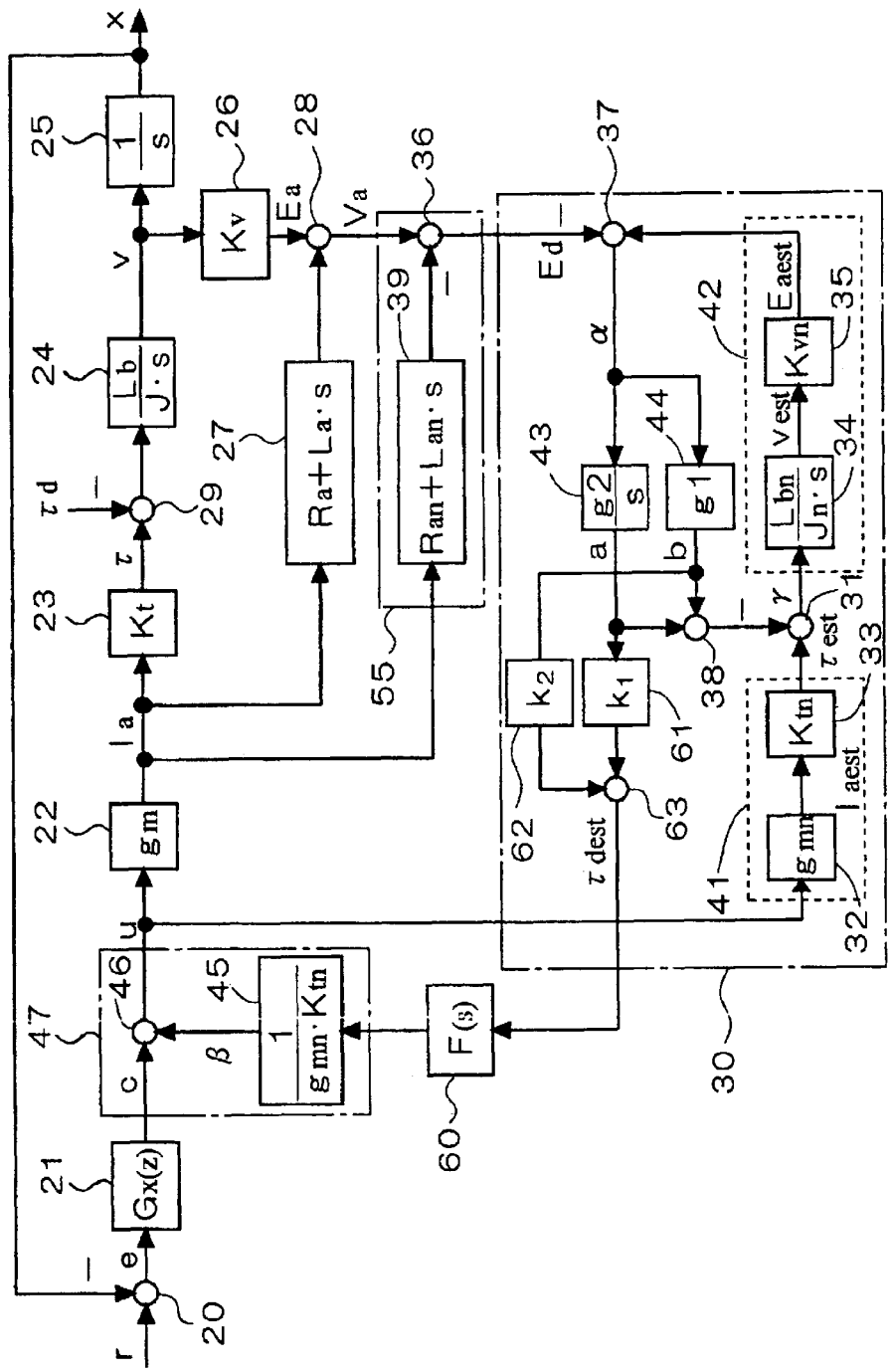
FIG. 2 is a block diagram illustrating the overall configuration of a positioning control system in the first embodiment according to the present invention.

The operation of a positioning control system of the disk drive in this embodiment is described with reference to FIG. 2. FIG. 2 is a block diagram illustrating the overall configuration of the position control system in the disk drive in the first embodiment.

A section 30 surrounded by a one-dot chain line is a block of the disturbance estimator 12. A section 47 similarly surrounded by a one-dot chain line is a block of the corrector 15, and a section 55 surrounded by a one-dot chain line is a block of the voltage detector 11. In FIG. 2, symbol s represents a Laplace operator. For brevity of description, hold elements by sector servo sampling are not shown in FIG. 2.

In FIG. 2, in the case where a present track position detected by the head 2 is x, the position error signal e for the target track position r is expressed by an equation (1) and this position error signal e is obtained by a comparator 20.

$$e = r - x \quad (1)$$

The position controller 14 represented by a block 21 in FIG. 2 conducts a digital filtering processing of a transfer function Gx(z) to the position error signal e output from the comparator 20, generates the position control signal c, and outputs the generated position control signal c to the corrector 15 represented by the block 47. The positioning control system is subjected to ordinary PID control and the transfer function of the position controller 14 can be expressed by an equation (2).

$$Gx(z) = Kx\left\{1 + ad(1 - z^{-1}) + ai\frac{z^{-1}}{1 - z^{-1}}\right\}. \quad (2)$$

In the equation (2), $z^{-1}$ indicates one sample delay and Kx indicates a proportional gain of the control system. Coefficients ad and ai indicate constants that represent frequency characteristics; ad indicates a derivative coefficient and ai indicates an integral coefficient. The position control signal c is converted to the driving signal u through an adder 46. The driver 10 represented by a block 22 (with a transfer function of gm) converts the driving signal u from a voltage signal to a current signal of gm times as high as the voltage signal, and outputs a driving current Ia. The actuator 7 represented by the block 23 converts the driving current Ia carried to the driving coil 5 into the driving torque τ according to the transfer function Kt by the interaction of the magnetic field generated by the driving current Ia and the magnetic flux of the magnet of the stator 6. The transfer function Kt is a torque constant of the actuator 7. A transfer function (Lb/J·s) of the block 24 represents transmission characteristics from the driving torque τ that acts on the arm 3 to the moving velocity v of the head 2. In this transfer function, symbol J indicates a moment of inertia of the arm 3 and Lb indicates a distance of the arm 3 from the bearing 4 to the head 2. A block 25 represents an integrator and a transfer function of the block 25 is represented by 1/s according to which the moving velocity v of the head 2 is converted into the present track position x.

A block 26 which represents the actuator 7 outputs an induction voltage Ea generated on both ends of the driving coil 5 in response to the rotation of the actuator 7. A block 27 outputs a voltage drop (Ra+La·s)·Ia generated by carrying the driving current Ia to the driving coil 5. The adder 28 adds the induction voltage Ea and the voltage drop (Ra+La·s)·Ia and thereby outputs the addition result as a terminal voltage Va of the actuator 7. Namely, a relationship as expressed by the following equation (3) is established:

$$Va = Ea + (Ra + La \cdot s) \cdot Ia \quad (3).$$

In the equation (3), symbol Ra indicates a coil resistance of the driving coil 5 and La indicates an inductance of the driving coil 5.

A disturbance τd, such as the bearing friction of the actuator 7, the elastic force of the FPC which connects the actuator 7 to an electronic circuit board, the inertial force applied to the actuator 7 due to the shock or vibration applied to the disk drive from the outside, that acts on the arm 3 can be expressed in a form of being input to the prior stage of the block 24 by the comparator 29.

A section 55 surrounded by a one-dot chain line in FIG. 2 indicates a block of the position detector 11. This block 55 includes a block 39 having the same transfer function as that of the block 27 included in the actuator 7 and a subtracter 36. The block 39 outputs the voltage drop (Ran+Lan·s)·Ia generated by carrying the driving current Ia to the driving coil 5 and the subtracter 36 subtracts the voltage drop from the terminal voltage Va of the actuator 7, whereby a voltage signal Ed is output from the block 55.

A section 30 surrounded by a one-dot chain line in FIG. 2 is a block of the disturbance estimator 12. This block 30 includes a block 32 having the same transfer function as that of the block 22 which represents the driver 10, a block 33 having the same transfer function as that of the block 23 which represents the actuator 7, a block 34 having the same transfer function as that of the block 24, and a block 35 having the same transfer function as that of the block 26. The blocks 32 and 33 constitute a first multiplier 41. Reference number 43 indicates a first integrator and 44 indicates a second multiplier. The blocks 34 and 35 constitute a second integrator 42. In the block 30, a suffix "n" of each constant indicates a nominal value and a variable with "est" indicates an estimated value.

The driving signal u input to the block 22 is also input to the block 32 that constitutes the first multiplier 41 and multiplied by (gmn·Ktn) by the blocks 32 and 33, thereby obtaining a driving torque estimation signal τest equal to the driving torque τ that acts on the arm 3.

In FIG. 2, a velocity estimation signal vest is output from the block 34. An induction voltage estimation signal Eaest obtained by multiplying the velocity estimation signal vest by Kvn by the block 35 is input to a comparator 37 and compared to the actually detected voltage signal Ed by the comparator 37. A deviation signal α (=Eaest−Ed) which is the comparison result is input to the first integrator 43 and the second multiplier 44, respectively. The first integrator 43 integrates the deviation signal α, multiplies the resultant signal by g2, and outputs an integral signal a. The second multiplier 44 outputs a proportional signal b obtained by multiplying the deviation signal α by g1. The integral signal a is input to the multiplier 61, in which the integral signal is multiplied by $k_1$ and the resultant signal is input to the adder 63. At the same time, the proportional signal b is input to the multiplier 62, in which the signal is multiplied by $k_2$ and the resultant signal is input to the adder 63. The adder 63 outputs the disturbance estimation signal τdest for the disturbance. Namely, the following relationship as expressed by equation (4) is established:

$$\tau dest = k_1 \cdot a + k_2 \cdot b \quad (4).$$

The integral signal a is obtained by integrating the deviation signal α (multiplying the deviation signal α by 1/s) and the proportional signal b is an actual number multiple of the deviation signal α. Therefore, the integral signal a has a phase delay relative to the proportional signal b by 90 degrees.

The integral signal a and the proportional signal b are input to the adder 38. An output of the adder 338 is input to the subtracter 31, in which the output (a+b) of the adder 38 is subtracted from the driving torque estimation signal τdest output from the block 33 and the subtraction result γ is output to the block 34.

The coefficient g1 of the second multiplier 44 and the coefficient g2 of the first integrator 43 are constants for stabilizing the operation of the disturbance estimator 12. This operation is described later in detail.

In FIG. 2, reference numeral 60 denotes a high frequency cut-off filter which conducts a filtering processing according to a transfer function F(s) to the disturbance estimation signal τdest output from the disturbance estimator 12 represented by the block 30, and eliminates a high frequency component contained in the disturbance estimation signal τdest. The signal which passes through the high frequency cut-off filter 60 is output to the block 47. The high frequency cut-off filter 60 can advantageously not only obtain a signal having less noise by eliminating the high frequency component contained in the disturbance estimation signal τdest but also improve the stability of the overall positioning control system in the case where the disturbance estimator is applied to the control system.

In FIG. 2, a section 47 surrounded by a one-dot chain line indicates a block of the corrector 15. A block 45 included in this block 47, i.e., the corrector 15 multiplies the disturbance estimation signal τdest by 1/(gmn·Ktn) and thereby generates a correction signal β which is to be transmitted to the driver 10 and which is necessary to generate a driving force that corresponds to the disturbance estimation signal τdest, on the arm 3. The correction signal β is added to the position control signal c by the adder 46.

Figure 3A:
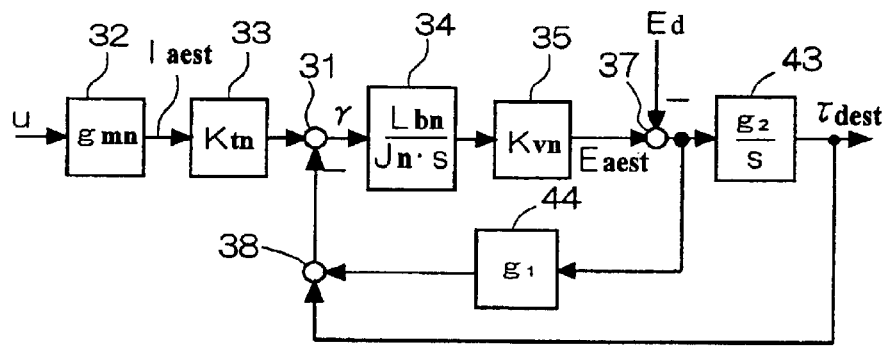
FIG. 3A is a block diagram for describing a disturbance estimation operation of a disturbance estimator in the first embodiment according to the present invention.

The operation of the disturbance estimator 12 represented by the block 30 is described in detail hereinafter with reference to FIGS. 3A to 3C. FIG. 3A is a block diagram which is rewritten from the block 30 of FIG. 2 and which illustrates transmission from the input of the driving signal u until the output of the disturbance estimation signal τdest.

It is assumed herein that the coefficients $k_1$ and $k_2$ of the multipliers 61 and 62 shown in FIG. 2 are set as expressed by the following equation 5:

$$k_1 = 1 \text{ and } k_2 = 0 \tag{5}$$

Figure 3B:
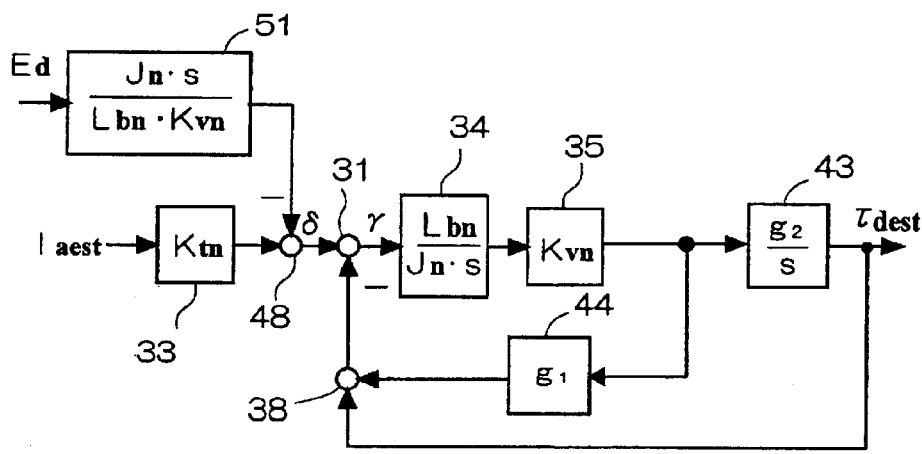
FIG. 3B is a block diagram equivalently converted from the block diagram of FIG. 3A.

FIG. 3B is a block diagram modified from the block diagram of FIG. 3A by equivalently converting and moving the input position of the voltage signal Ed (comparator 37) in the block diagram of FIG. 3A. For brevity of description, it is assumed herein that the coefficient gm of the block 22 and the coefficient gmn of the block 32 shown in FIG. 2 are equal as expressed by the following equation 6:

$$gm = gmn.$$

It is also assumed that the driving current Ia (=gm·u) is equal to the estimated current Iaest (=gmn·u).

When the voltage signal Ed is multiplied by (Jn·s)/(Lbn·Kvn), the input position of the comparator 37 shown in FIG. 3A can be equivalently moved to the input position of the subtracter 48 shown in FIG. 3B.

When attention is paid to the subtracter 48 shown in FIG. 3B, δ which is an output of the subtracter 48 is given by equation (7):

$$\delta = Ktn \cdot Ia - \frac{Jn \cdot s}{Lbn \cdot Kvn} Ed. \tag{7}$$

It is assumed herein that the following equation (8) is established as an ideal condition:

$$Ra = Ran \tag{8}$$

An inductance Lan of the driving coil 5 is lower than a resistance Ran. Therefore, in the block diagram of the positioning control system shown in FIG. 2, the block 39 included in the voltage detector 11 notes only a voltage drop by the coil resistance Ran and ignores a voltage drop by the inductance Lan among the voltage drop generated by carrying the driving current Ia to the driving coil 5. Namely, the following relationship as expressed by equation (9) is assumed to be established:

$$La = Lan = 0 \tag{9}$$

When attention is paid to the subtracter 36 and the equation (3) is assigned to Va, the voltage signal Ed is expressed by the following equation (10):

$$\begin{aligned} Ed &= Va - (Ran + Lan \cdot s) \cdot Ia \\ &= Ea + (Ra + La \cdot s) \cdot Ia - (Ran + Lan \cdot s) \cdot Ia \\ &= Ea. \end{aligned} \tag{10}$$

Next, when attention is paid to the subtracter 29 and the blocks 24 and 26 shown in FIG. 2, a relationship as expressed by equation (11) is established:

$$Ea = \frac{Lb \cdot Kv}{J \cdot s}(Kt \cdot Ia - \tau d). \tag{11}$$

It is assumed herein that the following equations (12) and (13) are established as ideal conditions:

$$Kt = Ktn \tag{12}$$

$$\frac{Lb \cdot Kv}{J} = \frac{Lbn \cdot Kvn}{Jn}. \tag{13}$$

When the equations (10) and (6) are assigned to the equation (7), the equation (7) is modified to equation (14) as follows:

$$\delta = \tau d \tag{14}$$

That is, δ which is the output of the subtracter 48 is equal to the disturbance τd that acts on the arm 3.

Therefore, when a transfer function from the disturbance τd that acts on the arm 3 until the disturbance estimation signal τdest is obtained from the block diagram of FIG. 3B, the transfer function is expressed by the following equation (15):

$$\tau dest = \frac{\frac{Lbn}{Jn} \cdot Kvn \cdot g2}{s^2 + \frac{Lbn}{Jn} \cdot Kvn \cdot g1 \cdot s + \frac{Lbn}{Jn} \cdot Kvn \cdot g2} \cdot \tau d. \tag{15}$$

The equation (15) demonstrates that the disturbance estimator 12 can estimate the actual disturbance τd from the driving signal u and the voltage signal Ed in a loop in the block 30 surrounded by the one-dot chain line shown in FIG. 2 by a secondary delay system.

When it is assumed herein that a natural angular frequency (estimated angular frequency) of the secondary delay system is ωo and a damping factor thereof is ζo, the constants g1 and g2 for stabilizing the operation of the disturbance estimator 12 can be expressed by the following equations (16) and (17), respectively:

$$g1 = 2\zeta o \cdot \omega o \cdot \frac{Jn}{Lbn \cdot Kvn} \tag{16}$$

$$g2 = \omega o^2 \cdot \frac{Jn}{Lbn \cdot Kvn} \tag{17}$$

When the estimated angular frequency ωo is set sufficiently higher than a position control band fc and the damping factor ξi is selected from 0.7 to 1, the disturbance estimator 12 can accurately estimate the disturbance τd such as the bearing friction, the elastic force or the inertial force.

Using the equations (16) and (17), the equation (15) is modified as follows:

$$\tau dest = \frac{\omega o^2}{s^2 + 2\zeta o \cdot \omega o \cdot s + \omega o^2} \cdot \tau d. \quad (18)$$

Figure 3C:
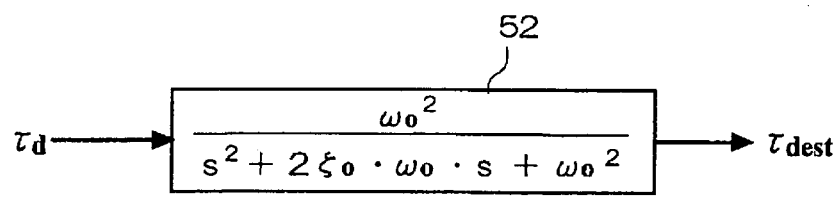
FIG. 3C is a block diagram that illustrates the block diagram of FIG. 3A in a unified manner.

Namely, the block diagram of the disturbance estimator 12 shown in FIG. 3A can be simplified as indicated by the block 52 of FIG. 3C.

Next, the operation of the corrector 15 indicated by the block 47 is described with reference to FIGS. 4A and 4B in detail.

The section 47 surrounded by the one-dot chain line shown in FIG. 2 indicates the block of the corrector 15. The block 45 outputs the correction signal β obtained by multiplying the disturbance estimation signal τdest by 1/(gmn·Ktn) to the adder 46. That is, the block 45 multiplies the disturbance estimation signal τdest by 1/(gmn·Ktn), and thereby outputs the correction signal β necessary to generate a driving force that corresponds to the disturbance estimation signal τdest on the actuator 7 to the adder 46. Further, since the correction signal β is multiplied by (gmn·Ktn) by the blocks 22 and 23, the disturbance estimation signal τdest is multiplied by 1/(gmn·Ktn) in advance so as to make the magnitude of the signals equal.

In short, the corrector is constituted to allow the disturbance estimation signal τdest to act on the actuator 7 so as to cancel the disturbance τd such as the bearing friction of the actuator, the elastic force of the FPC which connects the actuator 7 to the electronic circuit board or the inertial force applied to the actuator due to the shock or vibration applied to the disk drive from the outside.

Figure 4A:
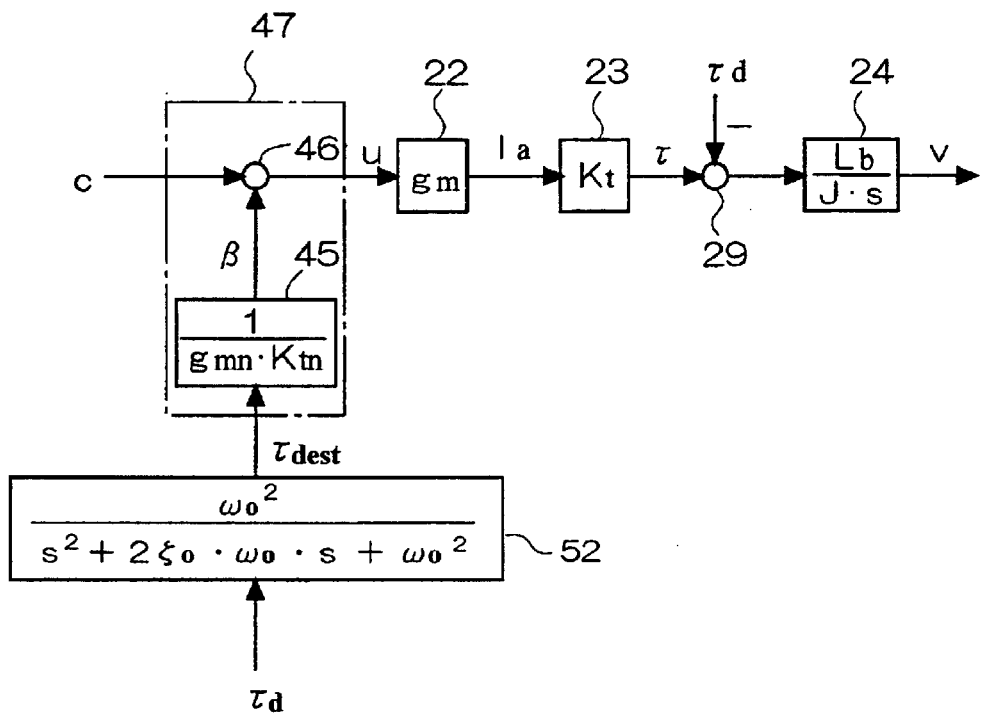
FIG. 4A is a block diagram for describing an operation of suppressing a disturbance applied to the disk drive in the first embodiment according to the present invention.

FIG. 4A is a block diagram illustrating that the sections from the adder 46 to the comparator 29 and to the block 24 related to the operation of the corrector 15 from the block diagram of FIG. 2. FIG. 4B is a block diagram illustrating that the disturbance τd applied to the comparator 29 and the disturbance τd applied to a block 52 are unified into one τd. In FIGS. 4A and 4B, components having like functions to those in the block diagram of FIG. 2 are indicated by the same reference numerals and are not repeatedly described herein.

In the block diagram of FIG. 4A, the block 52 corresponds to the block 52 shown in FIG. 3C and has a transfer function expressed by the equation (15).

Figure 4B:
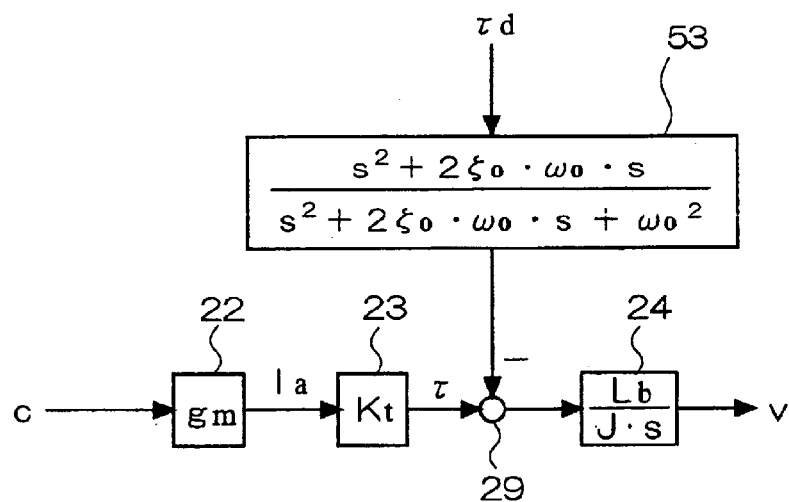
FIG. 4B is a block diagram equivalently converted from the block diagram of FIG. 4A.

Accordingly, it can be assumed from FIG. 4B that the disturbance τd applied to the arm 3 from the outside is applied to the head position control system through a filter expressed by the following equation (19).

$$Gd(s) = 1 - \frac{\omega o^2}{s^2 + 2\zeta o \cdot \varpi o \cdot s + \varpi o^2} \quad (19)$$
$$= \frac{s^2 + 2\zeta o \cdot \varpi o \cdot s}{s^2 + 2\zeta o \cdot \varpi o \cdot s + \varpi o^2}$$

Figure 5:
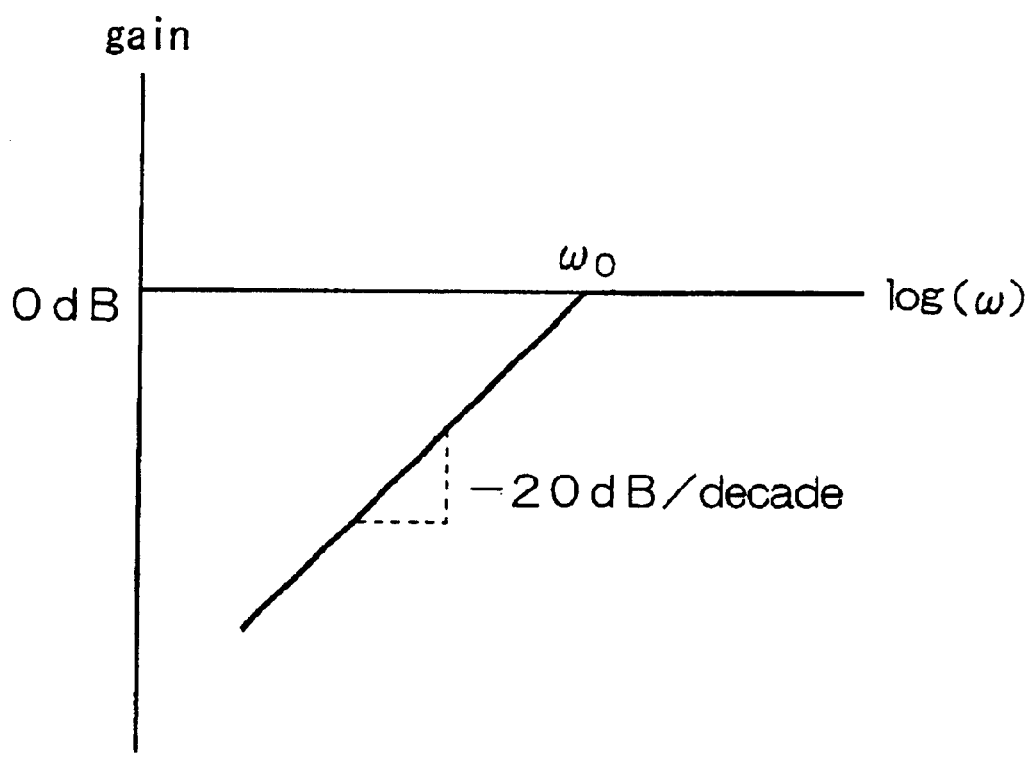
FIG. 5 is a characteristic view of a cut-off frequency relative to the disturbance applied to the disk drive in the first embodiment according to the present invention.

FIG. 5 illustrates frequency characteristics of the transfer function Gd(s) expressed by the equation (19) by a polygonal line approximation. The frequency characteristic of the transfer function Gd(s) shown in FIG. 5 demonstrates that a gain is 0 dB or less at an angular frequency lower than the angular frequency ωo and the gain damps at a damping ratio of −20 dB/dec (decades), where dec signifies tenfold. That is, FIG. 5 illustrates that the transfer function Gd(s) has low frequency cut-off filtering characteristics that the function Gd(s) can suppress frequencies lower than the angular frequency ωo.

In other words, even though the disturbance τd such as the bearing friction, the elastic force or the inertial force acts on the arm 3, the disk drive in this embodiment estimates this disturbance τd by means of the disturbance estimator 12 and controls the disturbance τd applied from the outside to be cancelled by the disturbance estimation signal τdest. Therefore, the disturbance τd applied from the outside acts as though the disturbance τd is applied to the head positioning control system through the filter having the cut-off frequency characteristics as shown in the equation (19) and FIG. 5.

Therefore, at a frequency equal to or lower than the angular frequency ωo, the disk drive in this embodiment can suppress the disturbance that acts on the actuator 7 by primary low frequency cut-off characteristics. The disturbance is the bearing of the actuator 7, the elastic force of the FPC which connects the actuator 7 to the electronic circuit board or the inertial force applied to the actuator 7 due to the shock or vibration applied to the disk drive from the outside.

Namely, even though the disturbance τd is applied to the actuator 7 from the outside, the disk drive in this embodiment controls the disturbance estimator 12 to estimate this disturbance τd and cancel the disturbance τd. Therefore, the disk drive has an advantage of functioning as if the device has a mechanical vibration control mechanism.

FIGS. 6A and 6B are time response waveform views for describing in more detail the disturbance suppression effect of the disturbance estimator 12 of the disk drive in this embodiment while the coefficients $k_1$ and $k_2$ of the multipliers 61 and 62 shown in FIG. 2 are set at 1 and 0, respectively.

FIG. 6A illustrates a waveform 71 (see a broken-line curve) of the disturbance τd that is the inertial force and acts on the actuator 7 when a rotational vibration in the form of a sine wave is applied to the disk drive and a waveform 72 (see a solid-line curve) of the disturbance estimation signal τdest output from the disturbance estimator 12.

A simulation is carried out while the estimation frequency fo (ωo=2Πfo) and damping factor ζo that determine the control parameters g1 and g2 expressed by the equations (16) and (17) are set at 1 kHz and 1, respectively, the control band of the position control system is set at 800 Hz, and the disturbance is assumed as a sine wave with a constant amplitude and a frequency of 100 Hz.

The disturbance estimator 12 estimates the disturbance τd that acts on the actuator 7 from the driving signal u input to the driver 10 and the voltage signal Ed output from the voltage detector 11, and outputs the position estimation signal τdest substantially similar to the actual disturbance τd although a slight time delay is present in the position estimation signal τdest.

FIG. 6B illustrates simulation results of a waveform 74 (see a solid-line curve) of the position error signal e when the disturbance estimation signal τdest output from the disturbance estimator 12 is input to the corrector 15 and the disturbance estimation signal τdest is caused to act on the actuator 7 so as to cancel a change of the disturbance, and a waveform 73 (see a broken-line curve) of the position error signal e when the disturbance estimator 12 is not applied to the disk drive. Even though a sinusoidal rotational vibration is applied to the disk drive from the outside, the position error signal e has no great change as indicated by the waveform 74 by applying the disturbance estimator 12 to the disk drive, and has an improved disturbance suppression effect of about ⅓ as compared to that of the waveform 73 which indicates a case where the disturbance estimator 12 is not applied.

As a matter of fact, the applicant of the present application already proposed the content of the above-stated basic technique by a patent application (see KOKAI No. 2002-42434). Preparatory description before the start of the description of the main concept of the present invention is over. The main concept of the present invention is now described.

FIG. 7 is a vector diagram for describing the operation of the disturbance estimator 12 of the disk drive in the first embodiment in more detail. FIG. 7 illustrates a phase relationship among the actual disturbance τd, the integral signal a, the proportional signal b, and the disturbance estimation signal τdest while considering that the disturbance estimation signal τdest is obtained from the relational equation (4).

In the basic technique content stated above, the coefficients $k_1$ and $k_2$ of the multipliers 61 and 62 shown in FIG. 2 are set at 1 and 0, respectively. In that case, the disturbance estimation signal τdest is expressed by the following equation (20) based on the equation (4):

$$\tau dest = a \quad (20).$$

Thus, the integral signal a is equal to the disturbance estimation signal τdest.

When $k_1$ and $k_2$ are set at 1 and 0, respectively, the disturbance estimator 12 estimates the actual disturbance τd by the secondary delay system based on the equation (15). Therefore, the phase of the disturbance estimation signal τdest has a phase delay θ relative to the actual disturbance τd. The integral signal a is a signal obtained by integrating the deviation signal α and the proportional signal b is a signal proportional to the deviation signal α. Accordingly, the proportional signal b has an advanced phase relative to that of the integral signal a by 90 degrees. The integral signal a is delayed in phase from the actual disturbance τd by θ. Therefore, by using the fact that the proportional signal b has an advanced phase relative to that of the integral signal a by 90 degrees and appropriately setting the coefficients $k_1$ and $k_2$ based on the equation (4), it is possible to make the disturbance estimation signal τdest close to the actual disturbance τd (see FIG. 7). This concept is the gist of the present invention.

FIGS. 8A and 8B are time response waveform views for describing the disturbance suppression effect of the disturbance estimator 12 of the disk drive in this embodiment while the coefficients $k_1$ and $k_2$ of the multipliers 61 and 62 shown in FIG. 2 are set at, for example, 1 and 0.7, respectively.

Similarly to FIGS. 6A and 6B, FIGS. 8A and 8B illustrate the waveform 71 (see a broken-line curve) of the disturbance τd that is the inertial force and acts on the actuator 7 when a rotational vibration in the form of a sine wave is applied to the disk drive and a waveform 75 (see a solid-line curve) of the disturbance estimation signal τdest output from the disturbance estimator 12.

The waveform 75 of the disturbance estimation signal τdet is generated by adding a signal obtained by multiplying the proportional signal b, which has an advanced phase from that of the integral signal a by 90 degrees, by $k_2$ to a signal obtained by multiplying the integral signal a by $k_1$. Therefore, a phase delay of the waveform 75 of the disturbance estimation signal τdest relative to the waveform 71 of the actual disturbance τd is smaller than that of the waveform 72 shown in FIG. 6A in which the coefficient $k_2$ is set at 0.

FIG. 8B illustrates a simulation result of a waveform 76 of the position error signal e when the disturbance estimation signal τdest thus obtained and output from the disturbance estimator 12 is input to the corrector 15 and the disturbance estimation signal τdest is caused to act on the actuator 7 so as to cancel a change of the disturbance. As compared to FIG. 6, the disturbance τd can be estimated accurately. Therefore, the waveform 76 shown in FIG. 8B has a further improved disturbance suppression effect by about ½ times as compared to the waveform 74 shown in FIG. 6B.

As a result, the disk drive in this embodiment can accurately detect the disturbance such as the inertial force that acts on the actuator 7 by the shock or vibration applied to the disk drive from the outside by means of the disturbance estimator 12, suppress a tracking deviation caused by the disturbance, and highly accurately control the head 2 to be positioned on the target track. Accordingly, the disk drive in this embodiment can ensure stable tracking control for a shock and a vibration and the reliability of the disk drive can be improved.

In the first embodiment stated above, the disk drive is constituted to input the driving signal u output from the block 47 as one of the input signals to the disturbance estimator 12. Needless to say, even though the driving current Ia output from the driver represented by the block 22 is employed in place of the driving signal u, the same advantages can be attained.

Second Embodiment

FIG. 9 is a block diagram illustrating the concrete configuration of the disturbance detector 12 that constitutes a disk drive in the second embodiment according to the present invention. Components having like functions as those in the block 30 shown in FIG. 2 which illustrates the configuration of the disk drive in the first embodiment are indicated by the same reference numbers and are not described herein repeatedly.

In the block 30 shown in FIG. 2, the proportional signal b is multiplied by $k_2$ by the multiplier 62 and the multiplied signal is input to the adder 63. In FIG. 9, by contrast, the proportional signal b is input to the multiplier 62 through a high frequency cut-off filter 64 which has a transfer function of Fb(s).

FIGS. 10A and 10B are time response waveform views for describing the disturbance suppression effect of the disturbance estimator 12 of the disk drive in this embodiment while the coefficients $k_1$ and $k_2$ of the multipliers 61 and 62 shown in FIG. 9 are set at, for example, 1 and 1, respectively and the cut-off frequency fb of the high frequency cut-off filter 64 is set at 500 Hz.

FIG. 10A illustrates the waveform 71 (see a broken-line curve) of the disturbance τd that is the inertial force and acts on the actuator 7 when a rotational vibration in the form of a sine wave is applied to the disk drive and a waveform 77 (see a solid-line curve) of the disturbance estimation signal τdest output from the disturbance estimator 12.

A simulation is carried out while the estimation frequency fo (ωo=2Πfo) and the damping factor ζo are set at 1 kHz and 1, respectively, the control band of the position control system is set at 800 Hz, and the disturbance is assumed as a sine wave with a constant amplitude and a frequency of 100 Hz similarly to FIGS. 8A and 8B.

The disturbance estimator 12 estimates the disturbance τd that acts on the actuator 7 from the driving signal u input to the driver 10 and the voltage signal output from the voltage detector 11, and outputs the position estimation signal τdest substantially similar to the actual disturbance τd although the disturbance estimation signal τdest is slightly larger in magnitude than the actual disturbance τd but a time delay is hardly present.

FIG. 10B illustrates a simulation result of a waveform 78 of the position error signal e when the disturbance estimation signal τdest output from the disturbance estimator 12 is input to the corrector 15 and the disturbance estimation signal τdest is caused to act on the actuator 7 so as to cancel a change of the disturbance. Even though a sinusoidal rotational vibration is applied to the disk drive from the outside, the position error signal e hardly changes as indicated by the waveform 78 shown in FIG. 10B by applying the disturbance estimator 12 to the disk drive. In addition, the disturbance estimator 12 can estimate the phase of the disturbance τd more accurately without the phase delay than that shown in FIGS. 8A and 8B. The waveform 78 shown in FIG. 10B has a further improved disturbance suppression effect of about ⅓ as compared to the waveform 76 shown in FIG. 8B.

When the disturbance estimator 12 shown in FIG. 9 is employed, it is unnecessary to specially provide the high frequency cut-off filter 60 as shown in FIG. 2. The reason is as follows. In FIG. 9, among the signals applied to the adder 63, the integral signal a is a signal obtained by integrating the deviation signal α by the first integrator 43. The integrator itself serves as a kind of a high frequency cut-off filter, so that the integral signal a input to the adder is a signal which has less noise and from which a high frequency component is eliminated. The proportional signal b input to the adder 63 is input thereto through the high frequency cut-off filter 64 shown in FIG. 9. Therefore, the disturbance estimation signal τdest combined by the adder 63 is a signal which has less noise and from which a high frequency component is eliminated, as well. Accordingly, when the disturbance estimator 12 shown in FIG. 9 is employed, there is no need to specially provide the high frequency cut-off filter 60 in the position control system shown in FIG. 2.

As a consequence, the disturbance estimator 12 of the disk drive in this embodiment can accurately detect the disturbance that acts on the actuator 7, accurately suppress a tracking deviation caused by the disturbance, and therefore control the head 2 to be accurately positioned on the target track formed to have a narrow pitch. Accordingly, the disk drive in this embodiment can ensure stable tracking control for a shock and a vibration and the reliability of the disk drive can be improved.

In the second embodiment stated above, the disk drive is constituted to input the driving signal u output from the block 47 as one of the input signals input to the disturbance estimator 12. Needless to say, even though the driving current Ia output from the driver 10 represented by the block 22 is employed in place of the driving signal u, the same advantages can be attained.

Third Embodiment

FIG. 11 is a block diagram illustrating the configuration of a disk drive in the third embodiment according to the present invention. FIG. 12 is a block diagram illustrating the overall configuration of a head positioning control system in this embodiment. Components having like functions as those in the first embodiment are indicated by the same reference numerals and are not described herein in detail.

The third embodiment differs from the first embodiment shown in FIG. 1 in the signals input to a disturbance estimator 16. In the first embodiment, the voltage signal Ed generated by the voltage detector 11 and the driving signal u are input to the disturbance estimator 12. In the third embodiment, the voltage signal Ed generated by the voltage detector 11 and the position control signal c generated by the position controller 14 are input to the disturbance estimator 16. That is, the position control signal c is used in place of the driving signal u.

The disturbance estimation signal τdest generated by the disturbance estimator 16 shown in FIG. 11 is input to the corrector 15. The corrector 15 inputs the position control signal c output from the position controller 14 and the disturbance estimation signal τdest of the disturbance estimator 16, after performing a correction operation, and then outputs the driving signal u to the driver 10.

A section 80 surrounded by a one-dot chain line shown in FIG. 12 is a block of the disturbance estimator 16. The disturbance estimator 16 inputs the voltage signal Ed which is generated by the voltage detector 11 and which is an output of the subtracter 36 and the position control signal c generated by the position controller 14 represented by the block 21.

In FIG. 12, the blocks 32 and 33 constitute the first multiplier 41 as a whole. Reference numeral 43 indicates the first integrator and 44 indicates the second multiplier. The blocks 34 and 35 constitute the second integrator 42 as a whole.

The operation of the disturbance estimator 16 constituted as stated above in this embodiment is described while comparing the operation with that of the disturbance estimator 12 in the first embodiment with reference to FIGS. 2 and 12.

In FIG. 2, when the input of the second integrator 42 that constitutes the disturbance estimator 12 in the first embodiment is assumed as γ, the signal γ can be expressed by the following equation (21) while paying attention to the adder 38 and the subtracter 31:

$$\gamma = \tau est - (a+b)$$
$$= gmn \cdot Ktn \cdot u - (a+b) \qquad (21).$$

For brevity, it is assumed herein that the high frequency cut-off filter 60 is not connected and the equations (6) and (12) are established.

Meanwhile, the driving signal u is expressed by the following equation (22) while paying attention to the adder 46 shown in FIG. 2.

$$\begin{aligned} u &= c + \beta \\ &= c + \frac{1}{gmn \cdot Ktn} \cdot \tau dest \\ &= c + \frac{1}{gmn \cdot Ktn} \cdot (k_1 \cdot a + k_2 \cdot b). \end{aligned} \qquad (22)$$

Accordingly, using the equations (21) and (22), the signal γ can be expressed by the following equation (23):

$$\gamma = gmn \cdot Ktn \cdot c + k_1 \cdot a + k_2 \cdot b - (a+b)$$
$$= gmn \cdot Ktn \cdot c - (1-k_1) \cdot a - (1-k_2) \cdot b \qquad (23).$$

When the block 30 representing the disturbance estimator 12 in the first embodiment shown in FIG. 2 is rewritten based on the equation (23), the block 30 is rewritten to the block 80 of the disturbance estimator 16 shown in FIG. 12. As shown in FIG. 12, the position control signal c generated by the position controller 14 (block 21) is input to the multiplier 32 and an output of the multiplier 32 is input to the multiplier 33. Due to this, by multiplying the position control signal c by the coefficient (gmn·Ktn), the driving torque estimation signal τest can be obtained.

On the other hand, the disturbance estimation signal τdest is input to the corrector 15 represented by the block 47. Similarly to the first embodiment, therefore, the disturbance estimator 16 functions to estimate the disturbance τd that acts on the arm 3 from the voltage signal Ed generated by the voltage detector 11 and the position control signal c generated by the position controller 14, and outputs the disturbance estimation signal τdest. The disturbance estimation signal τdest is input to the corrector 15 so as to cancel the disturbance τd that acts on the arm 3.

As a result, the disk drive controls the disturbance estimator 16 to accurately detect the disturbance τd that acts on the actuator 7 and thereby cancel the disturbance τd by the disturbance estimation signal τdest. Similarly to the first embodiment, the disturbance τd functions as though the disturbance τd is applied to the positioning control system through a filter having the cut-off frequency as shown in the equation (19) and FIG. 5. At a frequency equal to or lower than the angular frequency ωo, the disturbance can be suppressed by the primary low frequency cut-off characteristics and a tracking deviation caused by the disturbance can be thereby suppressed, so that the head 2 is controlled to be accurately positioned on the target track formed to have a narrow pitch. Accordingly, the disk drive in this embodiment can ensure stable tracking control for a shock and a vibration and the reliability of the disk drive can be thereby improved.

Furthermore, in this embodiment, when the coefficient $k_1$ is set at 1, the coefficient of the block 61 shown in FIG. 12 is 1 and the block 61 can be eventually omitted. Further, the coefficient of the block 81 is 0 and only the proportional signal b through the multiplier 72 is input to the subtracter 31, so that the block 81 and the adder 83 can be omitted. A state in which the blocks are omitted is shown in FIG. 13.

By decreasing the number of multipliers and adders as stated above, circuit adjustment can be simplified in the case where the position control system is realized by hardware such as an analog circuit. In addition, when the position control system is realized by software, an operation time delay caused by an arithmetic processing can be reduced.

Fourth Embodiment

FIG. 14 is a block diagram illustrating another example of the configuration of the disturbance estimator 16 which constitutes a disk drive in the fourth embodiment according to the present invention. Components having like functions as those in the block 80 shown in FIG. 11 are indicated by the same reference numerals and are not repeatedly described herein.

The block 80 in the fourth embodiment differs from the block 80 shown in FIG. 12 in the following respects. In FIG. 12, the proportional signal b is generated by multiplying the deviation signal α by g1 by the second multiplier 44, further multiplied by $k_2$ by the multiplier 62, and input to the adder 63. In the block 80 shown in FIG. 14, by contrast, the proportional signal b generated by multiplying the deviation signal α by g1 by the second multiplier 44 is input to the multiplier 62 through a high frequency cut-off filter 84 having a transfer function of Fb(s). In FIG. 12, the proportional signal b is multiplied by $(1-k_2)$ by the multiplier 82 and the resultant signal is input to the adder 83. In FIG. 14, the proportional signal b is multiplied by $(1-k_2 \cdot Fb(s))$ by a multiplier 85 and the resultant signal is input to the adder 83.

When the disturbance estimator 16 shown in FIG. 14 is employed, it is unnecessary to specially provide the high frequency cut-off filter 60 as shown in FIG. 12. The reason is as follows. In FIG. 14, among the signals applied to the adder 63, the integral signal a is a signal obtained by integrating the deviation signal α by the first integrator 43. The integrator itself serves as a kind of a high frequency cut-off filter, so that the integral signal a input to the adder 63 is a signal which has less noise and from which a high frequency component is eliminated. The proportional signal b input to the adder 63 is input thereto through the high frequency cut-off filter 84 shown in FIG. 14. Therefore, the disturbance estimation signal τdest combined by the adder 63 is a signal which has less noise and from which a high frequency component is eliminated, as well. Accordingly, when the disturbance estimator 16 shown in FIG. 14 is employed, there is no need to specially provide the high frequency cut-off filter 60 in the position control system shown in FIG. 12.

As a consequence, the disturbance estimator 16 of the disk drive in this embodiment can accurately detect the disturbance that acts on the actuator 7, accurately suppress a tracking deviation caused by the disturbance, and therefore control the head 2 to be accurately positioned on the target track formed to have a narrow pitch. Accordingly, the disk drive in this embodiment can ensure stable tracking control for a shock and a vibration and the reliability of the disk drive can be improved.

Furthermore, in this embodiment, when the coefficient $k_1$ is set at 1, the coefficient of the block 61 shown in FIG. 14 is 1 and the block 61 can be eventually omitted. Further, the coefficient of the block 81 is 0 and only the proportional signal b through the multiplier 85 is input to the subtracter 31, so that the block 81 and the adder 83 can be omitted. A state in which the blocks are omitted is shown in FIG. 15.

By decreasing the number of multipliers and adders as stated above, circuit adjustment can be simplified in the case where the position control system is realized by hardware such as an analog circuit. In addition, in the case where the position control system is realized by software, an operation time delay caused by an arithmetic processing can be reduced.

The four preferred embodiments of the present invention have been described so far. Next, the relationship between the coefficient $k_1$ of the multiplier 61 and the coefficient $k_2$ of the multiplier 62 is considered. The disturbance τd and the disturbance estimation signal τdest are vectors and they can be also expressed as complex numbers.

The relationship between a complex number and an argument thereof is described with reference to FIG. 16. An argument θ of a complex number z=x+jy (where j is an imaginary unit) is expressed by the following equation (24):

$$\theta = \angle(x + j \cdot y) = \tan^{-1} \frac{y}{x} \quad (24)$$

Referring to FIG. 17, the phase shift of the disturbance estimation signal τdest relative to the disturbance τd is described hereinafter.

For the equation (18) which represents the disturbance estimation signal τdest when $k_1$ and $k_2$ are set at 1 and 0, respectively, a phase delay θ1 of the disturbance estimation signal τdest relative to a certain angular frequency ωd ($=2\Pi\cdot fd$) of the disturbance τd is given as expressed by the following equation (25):

$$\theta 1 = \angle\left[\frac{\omega o^2}{s^2 + 2\zeta o \cdot \omega o \cdot s + \omega o^2}\right]_{s=j\omega d} \quad (25)$$

$$= \angle\left[\frac{\omega o^2}{\omega o^2 - \omega d^2 + j \cdot 2\zeta o \cdot \omega o \cdot s + \omega d}\right]$$

$$= \angle\left[\frac{\omega o^2}{\omega o^2 - \omega d^2 + (2\zeta o \cdot \omega o \cdot o + \omega d)^2} \cdot \{(\omega o^2 - \omega d^2) - j \cdot 2\zeta o \cdot \omega o \cdot \omega d\}\right]$$

$$= \tan^{-1}\left[-\frac{2\zeta o \cdot \omega o \cdot \omega d}{\omega o^2 - \omega d^2}\right]$$

This indicates the phase difference (with a minus sign) of the disturbance estimator based on the basic technique and the disturbance estimation signal τdest is set as expressed by the following equation (26):

$$\tau dest = a \quad (26)$$

$$= \frac{g2}{s} \cdot \alpha.$$

Next, according to the present invention in which the coefficients $k_1$ and $k_2$ are not zero, the disturbance estimation signal τdest is expressed by the following equation (27) based on the equation (4) and FIG. 2 or FIG. 12:

$$\tau dest = \left(k_1 \cdot \frac{g2}{s} + k_2 g1\right) \cdot \alpha \quad (27)$$

Normally, the following relationships as given by equations (28) (29) and (30) are established:

$$z_1 = x_1 + J \cdot y_1 = r_1(\cos\phi_1 + j \cdot \sin\phi_1) \quad (28)$$

$$z_2 = x_2 + J \cdot y_2 = r_2(\cos\phi_2 + j \cdot \sin\phi_2) \quad (29)$$

$$\frac{z_2}{z_1} = \frac{r_2}{r_1}\{\cos(\phi_2 - \phi_1) + j \cdot \sin(\phi_2 - \phi_1)\}. \quad (30)$$

Accordingly, an improved angle θ2 from the complex number $z_1$ to the complex number $z_2$ corresponds to the argument of the complex number $(z_2/z_1)$. Using the relationship of the equations (16) and (17), the improved angle θ2 is obtained as expressed by the following equation (31):

$$\theta 2 = \angle\left[\frac{k_1 \cdot \frac{g2}{s} + k_2 + g1}{\frac{g2}{s}}\right]_{s=j\omega d} \quad (31)$$

$$= \angle\left[k_1 + k_2 \cdot \frac{g1}{g2} \cdot 2\right]_{s=j\omega d}$$

$$= \angle\left[k_1 + k_2 \cdot \frac{2\zeta o}{\omega o} \cdot s\right]_{s=j\omega d}$$

$$= \angle\left[k_1 + j \cdot \frac{k_2 \cdot 2\zeta o \cdot \omega d}{\omega o}\right]$$

$$= \tan^{-1}\left[\frac{k_2 \cdot 2\zeta o \cdot \omega d}{k_1 \cdot \omega o}\right].$$

To make the phase difference of the disturbance estimation signal τdest relative to the disturbance τd zero, the ratio of the coefficients $k_1$ and $k_2$ is set as expressed by the following equation (32) by comparing the equations (25) and (31):

$$\frac{k_2}{k_1} = \frac{\omega o^2}{\omega o^2 - \omega d^2}. \quad (32)$$

At this time, the phase of the disturbance estimation signal τdest coincides with the phase of the disturbance τd. That is, the disturbance estimation signal τdest is an extremely accurate estimate of the disturbance τd.

When the control band of the control system is, for example, 800 Hz, the estimation frequency fo ($\omega o=2\Pi fo$) of the secondary delay system is set to be higher than 800 Hz, e.g., set at 1 kHz and the frequency fd ($\omega o=2\Pi fd$) of the disturbance τd is set at 100 Hz, the ratio of the coefficients $k_1$ and $k_2$ is given by, for example, the following expression (33):

$$\frac{k_2}{k_1} \approx 1.01. \quad (33)$$

At this time, the disturbance estimation signal τdest coincides with the disturbance τd in phase.

The disturbance estimator 12 constituted as the block 30 shown FIG. 2 or the disturbance estimator 16 constituted as the block 80 shown in FIG. 12 is not influenced by the sampling frequency of the sector servo of the disk drive. Therefore, the control band of the disturbance estimator can be set higher than that of the positioning control system.

The four preferred embodiments have been described so far. As is obvious from the above description, the present invention is characterized in that the signal obtained by multiplying the proportional signal b which has an advanced phase relative to the phase of the integral signal a by 90 degrees, by $k_2$ is added to the signal obtained by multiplying the integral signal a by $k_1$ and the disturbance estimation signal τdest is generated, thereby making the phase delay of the disturbance estimation signal τdest relative to the actual disturbance τd close to zero. By doing so, it is possible to sufficiently satisfactorily compensate for the disturbance, such as the bearing friction, the elastic force or the inertial force, that acts on the actuator. As a result, even though the change of the disturbance that acts on the actuator is large during a following operation in which the head follows up the target track, the disturbance can be cancelled sufficiently effectively and the positioning of the head on the target track can be stably controlled.

The technique described thus far can be advantageously developed to the loading/unloading control of the head relative to the disk. Preferred embodiments of the present invention that is applied to the loading/unloading control are described hereinafter.

Fifth Embodiment

The fifth embodiment of the present invention corresponds to the application of the technique of the disturbance estimator in the first embodiment to head loading/unloading control.

FIG. 18 is a block diagram illustrating the configuration of a disk drive in the fifth embodiment according to the present invention. Components having like functions as those in the first embodiment are indicated by the same reference numerals and are not repeatedly described herein.

The present embodiment differs from the first embodiment in the following respects. The disk drive shown in FIG. 18 does not include the position detector 13 and the position controller 14 shown in FIG. 1 but includes a velocity controller 17 instead. Reference numeral 9 indicates a ramp block serving as a head rest member arranged outside of a region occupied by the disk 1 and 3a indicates a suspension tab provided on a tip end of the arm 3. The suspension tab 3a slides on a tab holding surface on the ramp block 9 as the arm 3 rotates.

The velocity controller 17 generates a velocity control signal s from a velocity instruction signal vr and the voltage signal Ed from the voltage detector 11. Namely, the velocity controller 17 converts a velocity error signal e' using the velocity instruction signal vr and the velocity signal Ed into:

$$e=vr-Ed.$$

After performing amplification and phase compensation, the velocity controller 17 generates the velocity control signal s. The voltage signal Ed includes velocity information. A compensator 15a inputs the velocity control signal s output from the velocity controller 17 and the disturbance estimation signal τdest output from the disturbance estimator 12, performs a correction operation, and inputs the driving signal u to the driver 10. The driver 10 carries the driving current Ia to the driving coil 5 in response to the input driving signal u, thereby rotating the arm 3 around the bearing 4 and rotating and moving the head 2 attached to the tip end of the arm 3. The suspension tab 3a of the arm 3 is mounted on the tab holding surface of the ramp block 9 when the arm 3 is rotated toward the outer peripheral side of the disk 1, thereby unloading a head slider.

The operation of a velocity control system in this embodiment is described hereinafter with reference to FIG. 19. FIG. 19 is a block diagram illustrating the overall configuration of the velocity control system in this embodiment. As compared to FIG. 2 which illustrates the first embodiment, the velocity control system in this embodiment does not include the block 25 representing the integrator, and includes not the comparator 20 but a comparator that corresponds to the position detector 13. The voltage signal Ed including the velocity information and output from the block 36 is fed back to the comparator 13. The comparator 13 calculates a difference between the velocity instruction signal vr and the voltage signal Ed and thereby obtains a velocity error signal e'.

The velocity controller 17 represented by a block 21a conducts a filtering processing according to a transfer function Gv(s) to the velocity error signal e', generates the velocity control signal s, and inputs the velocity control signal s to the adder 46. The velocity control signal s is converted into the driving signal u through the adder 46. The disturbance τd, such as a sliding friction between the tab holding surface on the ramp block 9 and the suspension tab 3a, that acts on the arm 3 can be expressed in a form being input to a prior stage to the block 24 by a comparator 29. The remaining operation is equal to that of the first embodiment. The constitution of the block 30 that represents the disturbance estimator 12 which is an important component of the disk drive is equal to that of the block 30 in the first embodiment.

In the block 30, similarly to the first embodiment, the integral signal a generated by the first integrator 43 is multiplied by $k_1$ by the multiplier 61, the proportional signal b obtained by the second multiplier 44 is multiplied by $k_2$ by the multiplier 62, and these multiplication results are added by the adder 63, thereby generating the disturbance estimation signal τdest. By so adding, the phase of the disturbance estimation signal τdest is made close to that of the disturbance τd.

The disk drive in this embodiment can accurately detect the disturbance such as the friction by means of the disturbance estimator. Even though the disturbance on the ramp block changes greatly, the disk drive can ensure stable velocity control and the reliability of the head loading/unloading operation can be improved.

In this embodiment stated above, the disk drive is constituted to input the driving signal u output from the block 47 as one of the input signals to the disturbance estimator 12. Needless to say, even though the driving current Ia output from the block 22, i.e., from the driver is employed in place of the driving signal u, the same advantages can be attained.

Further, the block 30 representing the disturbance estimator 12 may be constituted to include the high frequency cut-off filter 64 as shown in FIG. 9 which illustrates the second embodiment.

Sixth Embodiment

The sixth embodiment of the present invention corresponds to the application of the technique of the disturbance estimator in the third embodiment to head loading/unloading control.

FIG. 20 is a block diagram illustrating the configuration of a disk drive in the sixth embodiment according to the present invention. FIG. 21 is a block diagram illustrating the overall configuration of a control system in this embodiment. Components having like functions as those in the fifth embodiment are indicated by the same reference numerals and are not repeatedly described herein.

The sixth embodiment differs from the fifth embodiment in the signals input to the disturbance estimator. That is, in the fifth embodiment, the disk drive is constituted to input the voltage signal Ed and the driving signal u generated by the voltage detector 11 to the disturbance estimator 12. In this embodiment, by contrast, the disk drive is constituted to input the voltage signal Ed generated by the voltage detector 11 and the velocity control signal s generated by the velocity controller 17 to a disturbance estimator 19.

The disturbance estimation signal τdest generated by the disturbance estimator 19 shown in FIG. 20 is input to the corrector 15a. The corrector 15a inputs the velocity control signal s output from the velocity controller 17 and the disturbance estimation signal τdest output from the disturbance estimator 19, after performing a correction operation, and outputs the driving signal u to the driver 10.

The block 80 surrounded by a one-dot chain line shown in FIG. 21 represents the disturbance estimator 19. The disturbance estimator 19 inputs the voltage signal Ed generated by the voltage detector 11 and output from the subtracter 36 and the velocity control signal s generated by the velocity controller 17 represented by the block 21.

In the fifth embodiment, the disturbance estimator 12 operates as follows. The signal multiplied by the coefficient (g2/s) of the block 43 as the first integrator and the signal multiplied by the coefficient (g1) of the block 44 as the second multiplier are added by the adder 38. A signal obtained as a result of the addition and the driving torque estimation signal Test multiplied by the coefficient (gmn·Ktn) of the block 41 as the first multiplier are input to the subtracter 31. The signal γ obtained as a result of the subtraction of the subtracter 31 is input to the block 42 as the second integrator. In other words, to input the driving signal u, to which the correction signal β is added, to the disturbance estimator 12, the adder 38 shown in FIG. 19 is required.

However, the disturbance estimator 19 in this embodiment is constituted to input the velocity control signal s to which the correction signal β is not added yet. Therefore, the adder 38 as shown in FIG. 19 can be omitted. The configuration of the block 80 representing the disturbance estimator 19 which is an important component of the disk drive is equal to that in the third embodiment shown in FIG. 12. Similarly to the third embodiment, the multiplier in the blocks 81 and 82 and the adder 83 are employed.

The operation of the disturbance estimator 19 constituted as stated above in this embodiment will be described while comparing the operation with the operation of the disturbance estimator 12 in the fifth embodiment with reference to FIGS. 19 and 21.

The operation of the disturbance estimator 19 is equal to that in the third embodiment. Namely, the integral signal an output from the first integrator 43 is multiplied by $k_1$ by the multiplier 61, the proportional signal b output from the second multiplier 44 is multiplied by $k_2$ by the multiplier 62, and these multiplication results are added by the adder 63 to generate the disturbance estimation signal τdest. By so adding, the phase of the disturbance estimation signal τdest is made close to that of the disturbance τd.

The disturbance estimation signal τdest is input to the corrector 15a so as to cancel the disturbance τd, such as the sliding friction between the tab holding surface on the ramp block 9 and the suspension tab 3a, that acts on the arm 3. As a result, the disk drive in this embodiment can accurately detect the disturbance τd such as the friction and realize stable velocity control even though the disturbance on the ramp block changes greatly.

According to the sixth embodiment, the number of adders necessary to constitute the disturbance estimator 19 and the corrector 15a can be decreased as compared to the disk drive in the fifth embodiment. Therefore, the disk drive in this embodiment can estimate the moving velocity v of the head and the disturbance τd, such as the friction, that acts on the velocity control system with the simpler configuration than that of the fifth embodiment and ensure stable head loading/unloading control.

In this embodiment, by decreasing the number of adders, circuit adjustment can be simplified when the velocity control system is realized by hardware such as an analog circuit. When the velocity control system is realized by software, an operation time delay caused by an operation processing can be reduced.

The block 80 representing the disturbance estimator 19 may be constituted to include the high frequency cut-off filter 84 as shown in FIG. 14 illustrating the fourth embodiment. In addition, the coefficient $k_1$ may be set at 1 as shown in FIGS. 13 and 15.

In the fifth and sixth embodiments, it is preferable that the ratio of the coefficients $k_1$ and $k_2$ is set to satisfy $k_2/k_1 = \omega o^2/(\omega o^2 - \omega d^2)$ in the equation (32) so that the disturbance estimation signal τdest which is an extremely accurate estimate of the disturbance τd can be generated.

Seventh Embodiment

In the seventh embodiment of the present invention, an operation for stably controlling a head moving velocity and an operation for highly accurately positioning the head on the target track formed to have a narrow pitch are switched over during head loading or unloading.

FIGS. 22 and 23 are block diagrams illustrating the configuration of a disk drive in the seventh embodiment. Components having like functions as those in the fifth and sixth embodiments are indicated by the same reference numerals and are not repeatedly described herein.

The disk drive shown in FIG. 22 is constituted to combine the first and fifth embodiments and switch over the functions of the first and fifth embodiments.

The disk drive shown in FIG. 23 is constituted to combine the third and sixth embodiments and switch over the functions of the third and sixth embodiments.

Each of these disk drives includes the position detector 13 which detects the position of the head 2, the position controller 14 which generates the position control signal c, and a switching unit 65. The head 2 reads a position signal recorded on the disk 1 as servo information in advance. The position detector 13 detects a current position of the head 2 by the position signal read by the head 2, and generates the position error signal e which indicates a difference between the current position of the head 2 and a target position of the target track. The position controller 14 inputs the position error signal e generated by the position detector 13, performs amplification and phase compensation, generates the position control signal c, and outputs the position control signal c to the switching unit 65. The position controller 17 generates the velocity control signal s from the velocity instruction signal vr and the voltage signal Ed from the voltage detector 11, and outputs the velocity control signal s to the switching unit 65.

The switching unit 65 selects one of the velocity control signal s generated by the velocity controller 17 and the position control signal c generated by the position controller 14 in accordance with a switching instruction of either a loading/unloading instruction or a following instruction input to a control terminal 67, and outputs a control signal c' to the corrector 15a.

In FIG. 22, the disturbance estimator 12 inputs the voltage signal Ed generated by the voltage detector 11 and the driving signal u. In FIG. 23, the disturbance estimator 12 inputs the voltage signal Ed generated by the voltage controller 11 and the control signal c'. The disturbance estimation signal τdest generated by each disturbance estimator 12 is input to the corrector 15a.

The corrector 15a inputs the control signal c' output from the switching unit 65 and the disturbance estimation signal τdest output from the disturbance estimator 12, after performing a correction operation by the corrector 15a, and outputs the driving signal u to the driver 10. The driver 10 carries the driving current Ia to the driving coil 5 in response to the driving signal u input to the driver 10, thereby rotating the arm 3 around the bearing 4. As a result, when the loading/unloading instruction is input to the control terminal 67 of the switching unit 65 as the switching instruction, the switch 66 of the switching unit 65 is connected to a terminal a and the head 2 is moved toward the target track on the disk 1 at a slow velocity similarly to the fifth and sixth embodiments. The head 2 can be relieved from the disk 1 to the ramp block 9 smoothly. When the following instruction is input to the control terminal 67 of the switching unit 65 as a switching instruction, the switch 66 of the switching unit 65 is connected to a terminal b and the head 2 is controlled to be positioned on the target track.

According to this embodiment, even though the disturbance on the ramp block changes greatly during head loading or unloading, the disturbance estimator 12 and the corrector 15a can cancel the influence of the disturbance. Therefore, the disk drive in this embodiment can ensure stable velocity control and the reliability of the head loading/unloading operation can be improved. In the head following operation, even though the disturbance such as the bearing friction of the bearing 4 or the elastic force of the flexible print board acts on the actuator 7, the disturbance estimator 12 and the corrector 15a can cancel the influence of the disturbance. Therefore, head positioning accuracy can be improved.

Although the above embodiments have been described while assuming that each of the multipliers and the integrators consists of an analog filter, it may consist of a digital filter. Further, the respective components that constitute the position control system in each of the embodiments may be realized by software for a microcomputer.

The disk drive and the disk drive control method according to the present invention is effective for not only the magnetic disk drive but also an information storage drives such as an optical disk drive or a magneto-optical disk drive.

In addition, concerning to each of the embodiments described above, the respective components may be constructed by hardwares or may be realized by a software.

From the above description, it will be apparent that the present invention provives.

What is claimed is:

1. A disk drive comprising:
    actuator means for positioning a head relative to a disk;
    driving means for driving the actuator means;
    voltage detection means for detecting a voltage generated when driving the actuator means, and for outputting a voltage signal;
    disturbance estimation means for estimating a magnitude of a disturbance applied to the head from a driving signal for the driving means and the voltage signal, and for generating a disturbance estimation signal;
    position detection means for generating a position error signal corresponding to a current position of the head from servo information recorded on the disk in advance and detected by the head;
    position control means for generating a position control means corresponding to the position error signal; and
    correction means for combining the position control signal with the disturbance estimation signal to obtain the driving signal, wherein
    the disturbance estimation means comprises:
    comparison means for comparing the disturbance estimation signal generated by the disturbance estimation means with the voltage signal, and for outputting a deviation signal; and
    addition means for adding a signal obtained by multiplying an integral signal, obtained by integrating the deviation signal, by a first coefficient and a signal obtained by multiplying a proportional signal proportional to the deviation signal by a second coefficient, and for generating the disturbance estimation signal.

2. The disk drive according to claim 1, wherein the disturbance estimation means comprises:
    comparison means which inputs the voltage signal detected by the voltage detection means;
    first multiplication means for multiplying the driving signal by a coefficient consisting of a first transfer function;
    second multiplication means for multiplying an output of the comparison means by a coefficient consisting of a second transfer function;
    first integral means for integrating the output of the comparison means; and
    second integral means for integrating a value obtained by subtracting an addition value, obtained by adding an output of the second multiplication means and an output of the first integral means, from an output of the first multiplication means, and wherein
    the comparison means compares an output of the second integral means with the voltage signal, and outputs a difference between the output of the second integral means and the voltage signal to the second multiplication means and the first integral means.

3. The disk drive according to claim 1, wherein a ratio $k_2/k_1$ of the first coefficient $k_1$ and the second coefficient $k_2$ is set to substantially satisfy $\omega o^2/(\omega o^2-\omega d^2)$, where $\omega o$ is an estimation frequency of the disturbance estimation means and $\omega d$ is a disturbance frequency.

4. The disk drive according to claim 1, wherein
    a control band of the disturbance estimation means is set wider than a control band of the position control means.

5. The disk drive according to claim 1: wherein
    the disturbance estimation means further comprises:
    filter means for cutting off a high frequency component of a proportional signal proportional to the deviation signal, and for generating a filter output signal; wherein
    the addition means adds a signal obtained by multiplying an integral signal, obtained by integrating the deviation signal, by a first coefficient and a signal obtained by multiplying the filter output signal by a second coefficient, and generates the disturbance estimation signal.

6. The disk drive according to claim 5, wherein
    the disturbance estimation means comprises:
    comparison means which inputs the voltage signal detected by the voltage detection means;
    first multiplication means for multiplying the driving signal by a coefficient consisting of a first transfer function;
    second multiplication means for multiplying an output of the comparison means by a coefficient consisting of a second transfer function;
    first integral means for integrating the output of the comparison means; and
    second integral means for integrating a value obtained by subtracting an addition value, obtained by adding an output of the second multiplication means and an output of the first integral means, from an output of the first multiplication means, and wherein
    the comparison means compares an output of the second integral means with the voltage signal, and outputs a difference between the output of the second integral means and the voltage signal to the second multiplication means and the first integral means.

7. The disk drive according to claim 5, wherein
    a ratio $k_2/k_1$ of the first coefficient $k_1$ and the second coefficient $k_2$ is set to substantially satisfy $\omega o^2/(\omega o^2-\omega d^2)$ where $\omega o$ is an estimation frequency of the disturbance estimation means and $\omega d$ is a disturbance frequency.

8. The disk drive according to claim 5, wherein a control band of the disturbance estimation means is set wider than a control band of the position control means.

9. A disk drive control method comprising the steps of:
    generating a position error signal corresponding to a current position of a head from servo information recorded on a disk in advance and detected by the head;
    generating a position control signal corresponding to the position error signal;
    generating a voltage estimation signal that is an estimate of a voltage signal, which is generated when driving actuator means for positioning the head, based on a driving signal for the actuator means and the voltage signal;

comparing the voltage estimation signal with the voltage signal, and generating a deviation signal which indicates a difference between the voltage estimation signal and the voltage signal;

adding a signal obtained by multiplying an integral signal, which is obtained by integrating the deviation signal, by a first coefficient and a signal obtained by multiplying a proportional signal proportional to the deviation signal by a second coefficient, and thereby generating a disturbance estimation signal;

combining the position control signal and the disturbance estimation signal, and generating the driving signal; and driving the actuator means by the driving signal, and positioning the head relative to the disk.

10. The disk drive control method according claim 9, wherein a ratio $k_2 k_1$ of the first coefficient $k_1$ and the second coefficient $k_2$ is set to substantially satisfy $\omega o^2/(\omega o^2-\omega d^2)$ where $\omega o$ is an estimation frequency of the disturbance estimation means and $\omega d$ is a disturbance frequency.

11. The disk drive control method according to claim 9, wherein a control band of the disturbance estimation is set wider than a control band of the position control.

12. The disk drive control method according to claim 9 further comprising the step of:

adding a signal obtained by multiplying an integral signal, which is obtained by integrating the deviation signal, by a first coefficient and a signal obtained by multiplying a filter output signal obtained by cutting off a high frequency component of a proportional signal proportional to the deviation signal by a second coefficient, and thereby generating the disturbance estimation signal;

combining the position control signal and the disturbance estimation signal, and generating the driving signal; and driving the actuator means by the driving signal, and positioning the head relative to the disk.

13. The disk drive control method according to claim 12, wherein a ratio $k_2/k_1$ of the first coefficient $k_1$ and the second coefficient $k_2$ is set to substantially satisfy $\omega o^2/(\omega o^2-\omega d^2)$, where $\omega o$ is an estimation frequency of the disturbance estimation means and $\omega d$ is a disturbance frequency.

14. The disk drive control method according to claim 12, wherein a control band of the disturbance estimation is set wider than a control band of the position control.

* * * * *